(12) United States Patent　　(10) Patent No.: US 12,673,369 B2
Cavalcabo et al.　　(45) Date of Patent: Jul. 7, 2026

(54) CALIBRATING MULTIPLE LASER BEAMS FOR ADDITIVE MANUFACTURING

(71) Applicants: TRUMPF Laser- und Systemtechnik GmbH, Ditzingen (DE); TRUMPF Additive Manufacturing Italia s.r.l., Schio VI (IT)

(72) Inventors: Guglielmo Cavalcabo, Milan (IT); Valentin Blickle, Stuttgart (DE); Christof Sailer, Ditzingen (DE); Johann Krauter, Stuttgart (DE); Elia Mantoan, Valli del Pasubio (IT)

(73) Assignees: TRUMPF LASER- UND SYSTEMTECHNIK GMBH, Ditzingen (DE); TRUMPF ADDITIVE MANUFACTURING ITALIA S.R.L., Schio VI (IT)

( * ) Notice: Subject to any disclaimer, the term of this patent is extended or adjusted under 35 U.S.C. 154(b) by 581 days.

(21) Appl. No.: 18/052,582

(22) Filed: Nov. 4, 2022

(65) Prior Publication Data

US 2024/0075529 A1　　Mar. 7, 2024

Related U.S. Application Data

(63) Continuation of application No. PCT/EP2021/061246, filed on Apr. 29, 2021.

(30) Foreign Application Priority Data

May 6, 2020　(EP) ...................................... 20173271

(51) Int. Cl.
B33Y 10/00　　(2015.01)
B22F 10/31　　(2021.01)
(Continued)

(52) U.S. Cl.
CPC ............ B22F 10/366 (2021.01); B22F 10/31 (2021.01); B22F 10/85 (2021.01); B22F 12/33 (2021.01);
(Continued)

(58) Field of Classification Search
CPC ........ B22F 10/28; B22F 10/31; B22F 10/366; B22F 10/85; B22F 12/33; B22F 12/45;
(Continued)

(56) References Cited

U.S. PATENT DOCUMENTS 11,014,196 B2　5/2021　Herzog et al.
2008/0246973 A1　10/2008　Regaard
(Continued)

FOREIGN PATENT DOCUMENTS

DE　　102005022095 B4　7/2007
DE　　102016200043 A1　7/2017
(Continued)

*Primary Examiner* — Philip C Tucker
*Assistant Examiner* — Jimmy R Smith, Jr.
(74) *Attorney, Agent, or Firm* — LEYDIG, VOIT & MAYER, LTD.

(57)　　　ABSTRACT

A method of automated alignment of scanning optics includes the steps of
　irradiating an object area of a layer of a powdered material provided on a building platform with at least one irradiation beam and irradiating a calibration area of the layer with at least one irradiation beam. A first irradiation beam is guided with a first scanning optic over an intermediate top face thereby melting a first calibration pattern into the intermediate top face and a second irradiation beam is guided with a second scanning optic over the intermediate top face thereby melting a second calibration pattern into the intermediate top face. At least one image is acquired of the intermediate top face and image points related to the geometrical features of the calibration patterns are identified so that a spatial offset
(Continued)

between the geometrical features can be derived. Based on the spatial offset, the scanning optics are aligned.

10 Claims, 13 Drawing Sheets

(51) Int. Cl.

| | |
|---|---|
| *B22F 10/366* | (2021.01) |
| *B22F 10/85* | (2021.01) |
| *B22F 12/33* | (2021.01) |
| *B22F 12/45* | (2021.01) |
| *B22F 12/90* | (2021.01) |
| *B33Y 30/00* | (2015.01) |
| *B33Y 40/00* | (2020.01) |
| *B33Y 50/02* | (2015.01) |
| *B22F 10/28* | (2021.01) |

(52) U.S. Cl.
CPC .............. *B22F 12/45* (2021.01); *B22F 12/90* (2021.01); *B33Y 10/00* (2014.12); *B33Y 30/00* (2014.12); *B33Y 40/00* (2014.12); *B33Y 50/02* (2014.12); *B22F 10/28* (2021.01)

(58) Field of Classification Search
CPC ..... B22F 12/90; B29C 64/153; B29C 64/268; B29C 64/282; B29C 64/393; B29C 64/386; B33Y 10/00; B33Y 30/00; B33Y 40/00; B33Y 50/02; B33Y 50/00; Y02P 10/25
See application file for complete search history.

(56) References Cited

U.S. PATENT DOCUMENTS

| | | | |
|---|---|---|---|
| 2016/0082668 A1 | 3/2016 | Perret et al. | |
| 2018/0370146 A1 | 12/2018 | Domröse et al. | |
| 2020/0156313 A1 | 5/2020 | Lehmann | |

FOREIGN PATENT DOCUMENTS

| | | |
|---|---|---|
| DE | 102016222559 A1 | 5/2018 |
| EP | 2732890 A2 | 5/2014 |
| EP | 2983898 A1 | 2/2016 |
| EP | 3202524 A1 | 8/2017 |
| EP | 3077872 B1 | 2/2018 |
| EP | 3351323 A1 | 7/2018 |
| EP | 3524409 A1 | 8/2019 |
| EP | 3626433 A1 | 3/2020 |
| WO | WO 2017158327 A1 | 9/2017 |
| WO | WO 2017174226 A1 | 10/2017 |
| WO | WO 2017187147 A1 | 11/2017 |
| WO | WO 2018122696 A1 | 7/2018 |
| WO | WO 2019002232 A1 | 1/2019 |
| WO | WO 2019150116 A1 | 8/2019 |
| WO | WO 2019158394 A1 | 8/2019 |
| WO | WO 2019161886 A1 | 8/2019 |

CALIBRATING MULTIPLE LASER BEAMS FOR ADDITIVE MANUFACTURING

CROSS REFERENCE TO RELATED APPLICATIONS

This application is a continuation of International Application No. PCT/EP2021/061246 (WO 2021/224099 A1), filed on Apr. 29, 2021, and claims benefit to European Patent Application No. EP 20173271.6, filed on May 6, 2020. The aforementioned applications are hereby incorporated by reference herein.

FIELD

The present disclosure relates generally to an additive manufacturing device with multi-beam irradiation using multiple scanning optics. Moreover, the present disclosure relates to a method of automated alignment of scanning optics of an additive manufacturing device.

BACKGROUND

In additive manufacturing such as selective laser sintering or selective laser melting, a powdered material such as a metal or ceramic powder is irradiated with electromagnetic radiation. Successively, thin layers of powder are provided within a chamber on a building platform to form three-dimensional objects by irradiating the respective layers of powder with an irradiation beam such as a laser beam. Respective devices are referred to as additive manufacturing devices, 3D-printing systems, selective laser sintering machines, or selective laser melting machines and the like. For the operation of such a device, it is referred to EP 2 732 890 A2, for example.

For increasing the speed of the building process or the size of an object that can be built, multiple irradiation beams can be used within one additive manufacturing device and for one building platform. For example, in an additive manufacturing device using multiple laser beams, the alignment of the coordinate systems of the underlying scanning optics that each direct a laser beam is to be maintained during the complete building process in order to guarantee a proper alignment of the scanned laser trajectories in the layer plane. In particular, an accuracy of the alignment between different laser beams/scanning optics is preferred to be in the range of 50% of a laser beam diameter and less.

With respect to calibrating an irradiation system of an apparatus for producing a three-dimensional workpiece, WO 2019/158394 A1 discloses irradiating a first irradiation beam and a second irradiation beam onto an irradiation plane such that operating axes of irradiation patterns traverse each other. A calibration is performed by determining a position of an intersection point between the irradiation patterns of the first irradiation beam and the second irradiation beam. Moreover, EP 2 983 898 A1 discloses determining a relative positional deviation between a first and second test pattern generated by two laser beams in a target within a powder layer for calibrating respective scanners. Furthermore, WO 2019/161886 A1 discloses building a first test structure by a first radiation beam and a second test structure by a second radiation beam and determining an offset between the two test structures.

A proper alignment of multiple laser scanners/scanning optics is in particular essential if a single object is manufactured with multiple irradiation beams. It is noted that in particular for large parts and temperature fluctuations, thermal effects onto the various components and the built part may require continuous calibration of the laser scanners during the manufacturing.

SUMMARY

In an embodiment, the present disclosure provides a method of aligning a first scanning optic associated to a first irradiation beam and a second scanning optic associated to a second irradiation beam during additive manufacturing of a target object. The method includes irradiating an object area of a layer of a powdered material provided on a building platform with at least one of the first irradiation beam or the second irradiation beam, and irradiating a calibration area of the layer of the powdered material with at least one of the first irradiation beam and the second irradiation so thereby forming an intermediate top face of the calibration object. The object area is associated with a cross-section of the target object and the calibration area is associated with a cross-section of a calibration object. The first irradiation beam is guided with the first scanning optic over the intermediate top face so as to melt a first calibration pattern having a first geometrical feature into the intermediate top face and the second irradiation beam is guided with the second scanning optic over the intermediate top face so as to melt a second calibration pattern having a second geometrical feature into the intermediate top face. At least one image of the intermediate top face is acquired including the first calibration pattern and the second calibration pattern. Using the at least one image, image points are identified related to the first geometrical feature and the second geometrical feature and, from the image points, a spatial offset is derived between positions of the first geometrical feature and the second geometrical feature within the layer of the powdered material. At least one of the first scanning optic or the second scanning optic is aligned taking into account the spatial offset.

In an embodiment, the present invention provides a device for additive manufacturing of three-dimensional objects from powdered material. The device includes an object forming chamber with a work surface and a building platform, wherein the building platform is adjustable in a vertical position with respect to a building platform opening for layer-by-layer manufacturing of a three-dimensional object and a calibration object on the building platform. A calibration camera is configured to acquire an image of at least a calibration section of the work surface that is associated to the calibration object. An irradiation system including at least two scanning optics is configured for guiding respective irradiation beams onto a layer of powdered material distributed on top of the building platform. A controller with at least one microprocessor and at least one storage device stores instructions that are operable, when executed by the at least one microprocessor, to cause the device to control the vertical position of the building platform, receive image data from the calibration camera, control the irradiation system, and automatically align the scanning optics according to the principles of the disclosed method.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
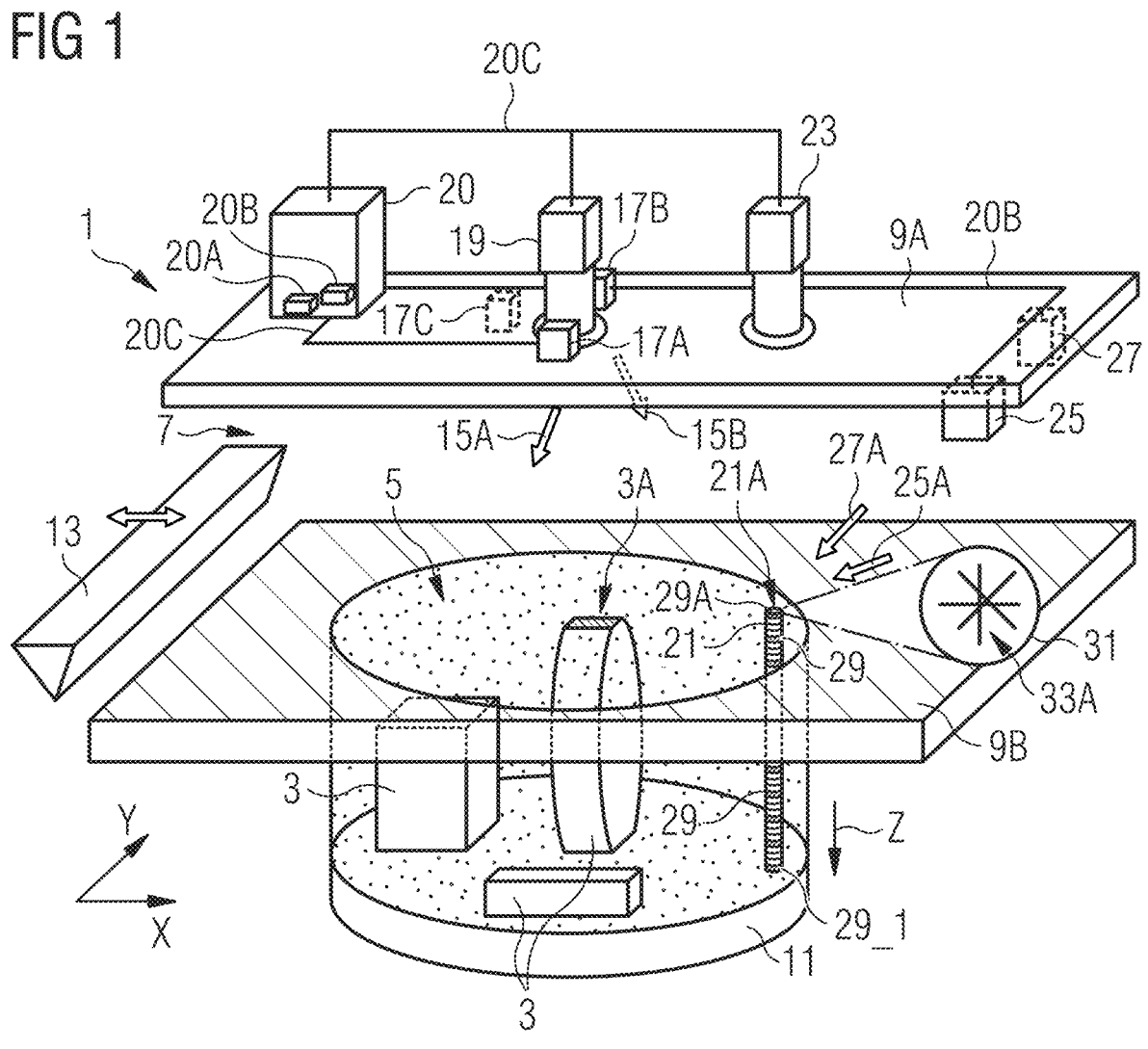
FIG. 1 is a schematic view of an exemplary additive manufacturing device.

Therefore, it is in particular an aspect of the present disclosure to provide a calibration procedure that can easily be performed in an automated manner, can be implemented in a simple manner also in existing additive manufacturing devices, and/or can be performed preferably throughout the manufacturing process.

In general, the present disclosure is directed, at least in part, to improving or overcoming one or more aspects of the prior systems, and in particular to provide an efficient approach for calibrating/aligning coordinate systems associated to respective irradiation beams in a multi-beam additive manufacturing device.

Thus, the present disclosure is directed, at least in part, to improving or overcoming one or more aspects of prior systems.

Some of the objects may be achieved by a method of automated alignment of a first scanning optic and a second scanning optic and a device for additive manufacturing of three-dimensional objects as recited in the claims.

In a first aspect, the present disclosure is directed to a method of automated alignment of a first scanning optic associated to a first irradiation beam and a second scanning optic associated to a second irradiation beam during additive manufacturing of a target object. The method comprises the steps:

irradiating an object area of a layer of a powdered material provided on a building platform with at least one of the first irradiation beam or the second irradiation beam, wherein the object area is associated with a cross-section of the target object;

irradiating a calibration area of the layer of the powdered material with at least one of the first irradiation beam and the second irradiation beam, where the calibration area is associated with a cross-section of a calibration object, thereby forming an intermediate top face of the calibration object;

guiding the first irradiation beam with the first scanning optic over the intermediate top face and thereby melting a first calibration pattern having a first geometrical feature into the intermediate top face;

guiding the second irradiation beam with the second scanning optic over the intermediate top face and thereby melting a second calibration pat-tern having a second geometrical feature into the intermediate top face;

acquiring at least one image of the intermediate top face having the first calibration pattern and the second calibration pattern thereon;

using the at least one image, identifying image points related to the first geometrical feature and the second geometrical feature;

from the image points, deriving a spatial offset between positions of the first geometrical feature and the second geometrical feature within the layer of the powdered material; and aligning at least one of the first scanning optic or the second scanning optic under consideration of the spatial offset.

In another aspect, a device for additive manufacturing of three-dimensional objects from powdered material comprises:

an object forming chamber with a work surface and a building plat-form, wherein the building platform is adjustable in a vertical position with respect to a building platform opening for layer-by-layer manufacturing of a three-dimensional object and a calibration object on the building platform;

a calibration camera configured to acquire an image of at least a calibration section of the work surface that is associated to the calibration object; and an irradiation system including at least two scanning optics configured for guiding respective irradiation beams onto a layer of powdered material distributed on top of the building platform; and a controller with at least one microprocessor and at least one storage device storing instructions that are operable, when executed by the at least one micro-processor, to cause the device to control the vertical position of the building plat-form, receive image data from the calibration camera, control the irradiation system, and execute a method as described above.

Further embodiments of the above aspects, are disclosed in the dependent claims, which are incorporated herein by reference.

For example, in some embodiments of the method, when forming the intermediate top face of the calibration object, the calibration area can be irradiated in a plurality of portions, wherein at least one of at least of the plurality of portions is manufactured to have a wave-shaped surface, and a first portion of the plurality of portions is irradiated by guiding at least one of the first irradiation beam or the second irradiation beam along scan vectors that run parallel to each other or deviate from running parallel by less than 10°.

In Some Embodiments, the Method May Further Comprise the Step:

directing an illuminating light beam onto the intermediate top face having the first calibration pattern and the second calibration pattern, wherein an incident direction of the illuminating light beam has an azimuthal component in the range from 45° to 90° with respect to the scan vectors of one of the portions of the calibration area and an inclination component in the range from 25° to 80°, preferably in the range from 40° to 60°, with respect to a normal direction of the layer of a powdered material, and wherein the at least one image of the intermediate top face with the first calibration pattern and the second calibration pattern is acquired while the illuminating light beam is directed onto the intermediate top face.

In some embodiments, for each orientation of parallel scan vectors, an illuminating light beam is directed onto the intermediate top face and an image is acquired, and the method may further comprise:

generating a superposition of the images acquired for each configuration of scan vectors, and the image points of the first feature and the second feature are identified based on the superposition of the images.

In some embodiments, the method may further comprise the step:

for each of the first calibration pattern and the second calibration pattern, melting a plurality of straight-line segments with a flat surface region, wherein for each of the first calibration pattern and the second calibration pattern, at least one of the plurality of straight-line segments extends in the first portion and is oriented with respect to the scan vectors used for the first portion under a first intersecting angle in the range from 45° to 90°, preferably under a first intersecting angle in the range from 60° to 90° or from 60° to 80°.

In some embodiments, a second portion of the plurality of portions can be irradiated by guiding at least one of the first irradiation beam and the second irradiation beam along scan vectors that run parallel to each other or deviate from running parallel by less than 10°, and wherein the scan vectors of the second portion differ in orientation with respect to the scan vectors of the first portion by an angle in the range from 45° to 90°, preferably by an angle in the range from 80° to 90°.

In some embodiments, for each of the first calibration pattern and the second calibration pattern, at least one of the plurality of straight-line segments can extend in the second portion and is oriented with respect to the scan vectors used for the second portion under an intersecting angle in the range from 45° to 90°, preferably under an intersecting angle in the range from 60° to 90° or from 60° to 80°.

In some embodiments of the method, the calibration area may include two pairs of opposing portions, each pair of portions is irradiated by guiding at least one of the first irradiation beam and the second irradiation beam along scan vectors, wherein the scan vectors of the two pairs are oriented with respect to each other under an angle in the range from 45° to 90°, preferably under an angle in the range from 80° to 90°, the first calibration pattern can include a pair of straight-line segments that cross in a first reference point defining the first geometrical feature, and each of the straight-line segments can extend sufficiently long enough within one of the pairs of opposing portions of the calibration area that an orientation of a straight-line segment can be estimated (e.g., for small calibration objects, e.g. in a range from 20% up), the second calibration pattern can include a pair of straight-line segments that cross in a second reference point defining the second geometrical feature and each of the straight-line segments extends sufficiently long enough within one of the pairs of opposing portions of the calibration area that an orientation of a straight-line segment can be estimated (e.g., for small calibration objects, e.g. in a range from 20% up), the spatial offset is the difference in positions of the first reference point and the second reference point, the straight-line segments are respectively generated by moving the respective irradiation beam along linear scan vectors, wherein orientations of the linear scan vectors of the first calibration pattern are inclined with respect to orientations of the linear scan vectors of the second calibration pattern, and preferably the linear scan vectors of the first calibration pattern and the linear scan vectors of the second calibration pattern respectively cross under an angle in the range from 80° to 90°.

In an exemplary embodiment, one may create a length of a line segment to be, e.g., 8 mm on a cylindrical column of 36 mm diameter.

In some embodiments of the method, the calibration area can include at least two portions and the at least two portions are irradiated by guiding at least one of the first irradiation beam and the second irradiation beam along scan vectors, wherein the scan vectors in one of the at least two portions are oriented with respect the scan vectors in another one of the at least two portions under an angle in the range from 45° to 90°, preferably under an angle in the range from 80° to 90°, and the first calibration pattern and the second calibration pattern can each include straight-line segments generated by guiding the respective irradiation beam along linear scan vectors, wherein orientations of the linear scan vectors of the first calibration pattern are inclined with respect to orientations of the linear scan vectors of the second calibration pattern, and the straight-line segments can be associated to linear extensions that respectively cross in a first reference point defining the first geometrical feature or a second reference point defining the second geometrical feature, wherein the linear extensions respectively cross for the first calibration pattern and the second calibration pattern preferably under an angle in the range from 80° to 90°.

In some embodiments of the method, the first calibration pattern and the second calibration pattern can each include straight-line segments and the method may further comprise:

in the at least one image, deriving straight lines that extend through the images of the straight-line segments and identifying the image points at a crossing of the straight lines, and deriving the spatial offset in the layer of the powdered material from the distance between the image points in the image.

In some embodiments of the method, aligning the first scanning optic or the second scanning optic can include setting an optical beam path through a respective scanning optic or a zero-point associated to the respective scanning optic for guiding the laser beams across the powder bed in line with a machine coordinate system; and/or a first layer associated to the calibration object can be attached to the building platform and preferably the calibration object can be positioned at a border region of the building platform. In addition or alternatively, for a plurality of layers of the powdered material applied for the manufacturing of the target object, the first calibration pattern and the second calibration pattern can be melted into respective intermediate top faces of the calibration object to repeatedly perform the alignment of the first scanning optic and the second scanning optic throughout the additive manufacturing.

In some embodiments of the device, the device may further comprise:

an illuminator positioned to direct an illuminating light beam onto the calibration section, and wherein the at least one storage device can further store instructions that are operable, when executed by the at least one microprocessor, to activate the illuminator to illuminate the calibration section, and control the calibration camera to acquire an image while the illuminator is activated.

In some embodiments of the device, the illuminator can be configured to emit a light beam onto an intermediate top face of the calibration object under an incidence direction in the range from 25° to 80°, preferably in the range from 40° to 60°, with respect to a normal direction of a layer of a powdered material.

In some embodiments of the device, at least one of the calibration camera can be positioned vertically above the calibration section, the calibration camera can be configured to image the complete work surface, the calibration section can be located at a border region of the building platform opening, or the device can further comprises a powder system configured for distributing powdered material across the work surface with a powder depositing tool to provide the powdered material layer by layer on the building platform during the additive manufacturing. The alignment of the first and second scanning optics preferably such that, when repeating the calibration procedure in a subsequent layer of powdered material, the first feature/reference point and the second feature/reference point differ in position by less than a threshold value. The threshold value may optionally be wet to be equal to or smaller than a laser beam spot size, e.g. 50% of the laser beam spot size on the layer of powdered material.

Another aspect relates to a computer program product comprising instructions to cause the herein disclosed device for additive manufacturing to execute the steps of the method of automated alignment.

In some embodiments, when reading an additive manufacturing instruction protocol that includes irradiation instructions for manufacturing the target object into a control unit, the control unit adds irradiation instructions for manufacturing the calibration object layer by layer and calibration instructions that perform the image analysis and the offset determination.

Another aspect relates to a method for marking and analyzing an intermediate layer in particular for optical calibration of one or more scanning optics. The method includes:

generating an intermediate layer to have a diffuse scattering and/or rough surface, wherein the intermediate layer is generated by additive manufacturing based on a first irradiation strategy;

marking the intermediate layer with a laser beam used for the additive manufacturing at the top face based on a second irradiation strategy;

illuminating the top face with a light beam at an angle generating increased scattering; and taking an image of the top face, in which an imaging signal/detected light is increased a region generated with the first irradiation strategy only, e.g. for the diffuse scattering and/or rough surface, with respect to an imaging signal for the region marked with the second irradiation strategy.

An advantage of the herein disclosed calibration is that any part/object can be produced with multiple laser beams without any lack of quality due to a misalignment of laser beams, specifically a misalignment of the scanning optics.

Other features and aspects of this disclosure will be apparent from the following description and the accompanying drawings.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that proper alignment of a multi-beam irradiation system can be ensured by growing a calibration structure additionally during the additive manufacturing process (i.e., at the same time of growing the 3D-object and preferably separate from the same). The calibration structure includes specific intermediate calibration layers that are used for analyzing the calibration status of the multi-beam irradiation system. The intermediate calibration layers may include specific calibration patterns each generated with one of the irradiation systems and each defining a reference point for that irradiation system. Moreover, it was realized that detection of calibration patterns can be improved by forming the same on a specifically prepared intermediate calibration layer that improves the image acquisition, specifically the contrast, under respectively set illumination conditions.

In the following, an additive manufacturing device is described in connection with FIG. 1. An exemplary implementation of the herein proposed concept for calibrating multiple radiation sources is described for multi-laser beam based additive manufacturing in connection with FIGS. 2 to 6B. In connection with FIGS. 7A and 7B, an alternative geometrical implementation as well as a further use of the herein described imaging concepts is described. Exemplary implementations of the concept for calibrating multiple scanning optics into an additive manufacturing process is finally described in connection with FIGS. 8A and 8B.

FIG. 1 illustrates schematically a device 1 for additive manufacturing of three-dimensional objects 3 (herein also referred to as target objects) from a powdered material 5. Device 1 includes an object forming chamber 7 within a housing that provides for the required environment of the manufacturing process. FIG. 1 schematically shows a top cover 9A and a work surface 9B delimiting the chamber 7. The chamber 7 is further delimited by sidewalls and a back wall (not shown). A front door (also not shown) may provide access to the chamber 7.

The additive manufacturing process is performed on the work surface 9B, specifically on a building platform 11. The building platform 11 can be lowered along direction Z to successively provide new layers of powdered material for a layer-by-layer manufacturing process. The powdered material can be evenly spread onto the building platform 11 by a powder depositing tool 13 to form a powder bed. The powder depositing tool 13 extends in direction Y and can be moved in direction X across the work surface 9B to a building platform opening 11A in which the powder bed is formed on top of the building platform 11. Thus, the layers of powdered material 5 extend within a layer plane, here the X-Y-plane.

The powder bed is prepared for being irradiated with laser radiation to initiate a powder melting process by absorption of the laser radiation and followed by a solidification process within the respective cross-sections of the objects 3.

For that purpose, the powdered material is irradiated with a plurality of laser beams 15A, 15B emitted by one or more laser sources and directed onto specific positions of the powder bed. Each laser beam 15A, 15B is guided with a scanning optic 17A, 17B (also referred to as scanning system or scanner) that is set with respect to a machine coordinate system extending in the work surface 9B. The scanning optic 17A, 17B can include lenses and mirrors and in particular a scan mirror that is adjustable in its orientation in space to reflect the laser beam in a specific direction onto a desired point in the machine coordinate system. The orientation of the scan mirror can be set by a micro-drive, e.g. for orienting a scan mirror, e.g. in 3D-space. In principle, the scan field that can be reached with a scanning optic is associated to the machine coordinate system within the layer plane (X-Y-plane). Each scanning optic 17A, 17B is calibrated on its respective scan field (the scan field is not necessary to be 100% of the entire powder bed). The calibration of the scan field is usually performed by a software/digital calibration of parameters used for driving the scanning optic 17A, 17B. By adjusting a scan mirror in 3D-space, for example, the parameters allow, setting an X-Y-offset of a zero-point with respect to the powder bed as well as a rotation angle of a scan movement (e.g. one or more basic directions of a scan movement over the powder bed, e.g., the X-Y-directions). Moreover, regarding the scanning process, an amplitude and/or speed of a scan movement can be set.

As the herein disclosed concepts are applicable also to more than two laser beams, an exemplary third scanning optic 17C is indicated in FIG. 1 in dashed lines. The laser source(s) such as a fiber or a disc laser may be provided on top of the top cover 9A or may be positioned differently such that the laser beams need to be guided, e.g., by light fibers to the scanning optics 17A, 17B.

The manufacturing process can be monitored with a monitoring camera 19 that is, for example, positioned centrally above the building platform 11. The monitoring camera 19 can have a resolution of about 90 μm per pixel and may be configured for a low distortion of the acquired images of the work surface 9B. Providing a dedicated camera for monitoring the generative growing can offer an improved performance. However, as explained below, various tasks can be performed by a single camera, e.g., the monitoring camera 19 may also be used for the calibration procedure.

Each of the laser beams 15A, 15B is moved across the powder bed in accordance with a scanning trajectory. For example, the scanning trajectory can be composed of a plurality of linear scan vectors, i.e., linear trajectory segments. Parallel linear scan vectors can be grouped into hatches. A plurality of hatches extends over each of the cross-sections of the objects 3 as defined in a CAD/CAM control file (also referred herein to as additive manufacturing instruction protocol) of a specific manufacturing job.

For controlling the additive manufacturing, the device 1 includes a controller 20 with at least one microprocessor 20A and at least one storage device 20B. The at least one storage device 20B stores instructions that are operable, when executed by the at least one microprocessor 20A, to cause the device 1 to control the vertical position of the building platform 11, receive image data from cameras, and control the irradiation system (e.g., setting the laser parameters and guiding the laser beams over the powder bed. For example, the CAD/CAM control file can be loaded into the at least one storage device 20B to provide the instructions to the microprocessor 20A.

The CAD/CAM control file includes instructions that, when executed by the at least one microprocessor 20A of the controller 20, define which laser beam is directed onto which portion of the cross-section. For that purpose, the controller 20 is, for example, connected to the scanning optics 17A, 17B for setting respective drives. Obviously, a high spatial calibration of the laser beam trajectories of different laser beams 15A, 15B is required to ensure proper bordering of those regions irradiated by the different laser beams 15A, 15B.

In addition, the CAD/CAM control file can include parameter values for the laser system, the lowering of the building platform 11, the powder depositing tool 13 etc.

For the herein disclosed calibration, the CAD/CAM file is extended with instructions to form a calibration object 21 at the same time as forming the objects 3. As shown in FIG. 1, the calibration object 21 is, for example, cylinder shaped with a diameter of, for example, about 8 mm to 10 mm. The calibration object 21 is located close to the border of the building platform 11, thereby taking only a limited space for the arrangement of objects 3 to be build.

For the calibration, the device 1 further includes a calibration camera 23 and two illuminators 25, 27 for illuminating the work surface 9B and in particular a top layer of the calibration object 21. Schematically, two illuminating light beams 25A, 27A are indicated in FIG. 1. The illuminators 25, 27 can be LED light sources that are configured to emit a light beam onto the work surface 9B, specifically an intermediate top face of the calibration object 21.

The herein proposed calibration can be performed every couple layers, i.e., an intermediate layer, such as every fourth layer. The calibration may also be initiated depending on need. FIG. 1 shows a plurality of intermediated layers 29 schematically in the calibration object 21. Intermediate layers 29 were used for calibration of the offset, for example. "Intermediate" relates here to the fact that the layers are used for calibration but then are grown over. A first intermediate layer 29_1 may be attached to the building platform 11 and allow a first calibration. An intermediate layer 29A is "currently" processed in FIG. 1 and to be used for the calibration.

For the intermediate layer 29A, FIG. 1 shows an illustration of a circular (intermediate) top face 31 of the cylinder-shaped calibration object 21. An image of the top face 31 can be acquired with the calibration camera 23. In reference to the following discussion of the herein disclosed concepts of calibration, laser generated calibration patterns 33 are schematically indicated on the top face 31 shown.

Figure 2:
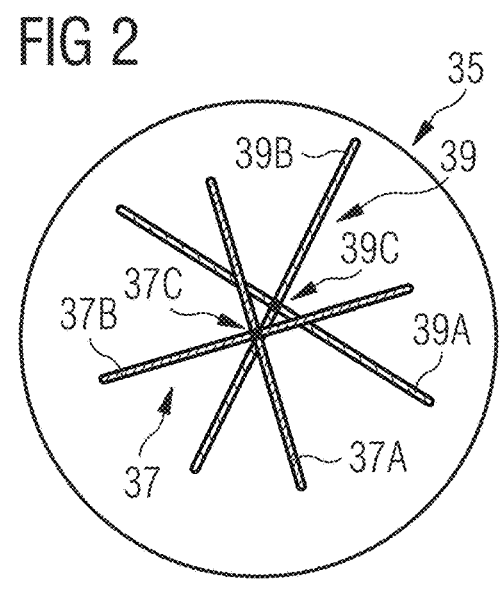
FIG. 2 is a schematic image of a top-face of a calibration structure having two pairs of crossing lines as calibration patterns thereon.

Specifically, as shown in more detail in FIG. 2, a cross-like structure (two pairs of linear lines crossing each other or linear lines associated to an identified structure) can be created with each laser beam 15A, 15B on the surface of the calibration object 21 by a re-melting process, i.e., after the intermediate layer was processed.

The calibration camera 23 takes pictures of top face 31 with the marked cross-like structures. The controller 20 is data-connected to the calibration camera 23 (as well as optionally the monitoring camera 19) for receiving image data. Similarly, the controller 20 is data-connected to the two illuminators 25, 27 for controlling an illumination condition. (See exemplary data lines 20C in FIG. 1.)

The calibration procedure uses, for example, a calibration algorithm that can be executed in the microprocessor 20A of the controller 20. The calibration algorithm can include an image analysis sub-routine and a calibration-setting sub-routine.

The image analysis sub-routine is programmed to identify a reference point for each cross such as a center or crossing point, and calculate an offset between the two crosses. The calibration-setting sub-routine is programmed to derive an offset compensation value as a control parameter to one or both of the scanning optics 17A, 17B. By applying the control parameter, the alignment of the laser beams 15A, 15B is improved.

For the calibration, a beam spot size of each of the laser beams 15A, 15B—as given at the work surface 9B in the area of the calibration object 21—can be, for example, in the range from 50 μm up to 100 μm. The calibration camera 23 can have, for example, a resolution of 25 μm per pixel and may be dedicated specifically to the calibration procedure. While the configuration of device 1 shown in FIG. 1 has the monitoring camera 19 located above a center of the building platform 11 (also referred to as substrate) and the calibration camera 23 above a border area of the substrate, in some embodiments the monitoring camera 19 may also be used for the calibration procedure.

FIG. 2 shows a superimposed image 35 of the top face 31. The superimposed image 35 is the result of two images acquired based on the procedure explained in connection with FIGS. 3A to 3C. Specifically, two images were superposed onto each other that were imaged for different illumination settings.

The superimposed image 35 shows two crosses 37, 39 (calibration patterns) formed of respective pairs of orthogonal straight-line segments (short straight lines) 37A, 37B and 39A, 39B (the lines are line shaped surface areas that were created by re-melting the top face 31). Each of the illumination settings increases the contrast for straight lines extending essentially along the respective illumination direction, such as lines 37A, 39A and lines 37B, 39B.

For each of the crosses 37, 39, a crossing point 37C, 39C of the respective straight lines is schematically indicated. The crossing points 37C, 39C can be considered reference points in the manufacturing coordinate system that are supposed to be at specific preset positions of the work surface 9B. For example, the crossing points 37C, 39C should coincide for perfect alignment. At least an offset (spatial distance) between the crossing points 37C, 39C should be less than a preset value such as less than, e.g., 50% of a beam spot size. When determining an offset associated to the irradiation system of the device 1, specifically the scanning optics 17A, 17B used for generating the crosses 37, 39, the image analysis sub-routine derives image points corresponding to the crossing points and the calibration-setting sub-routine derives from the distance in the image plane between the image points the distance of the respective points in the work surface 9B, which is related to the offset of the scanning optics 17A, 17B.

As mentioned above, a re-melting process can be used to increase the viewability of the crosses 37 and 39 in the images acquired with the calibration camera 23.

Figure 3:
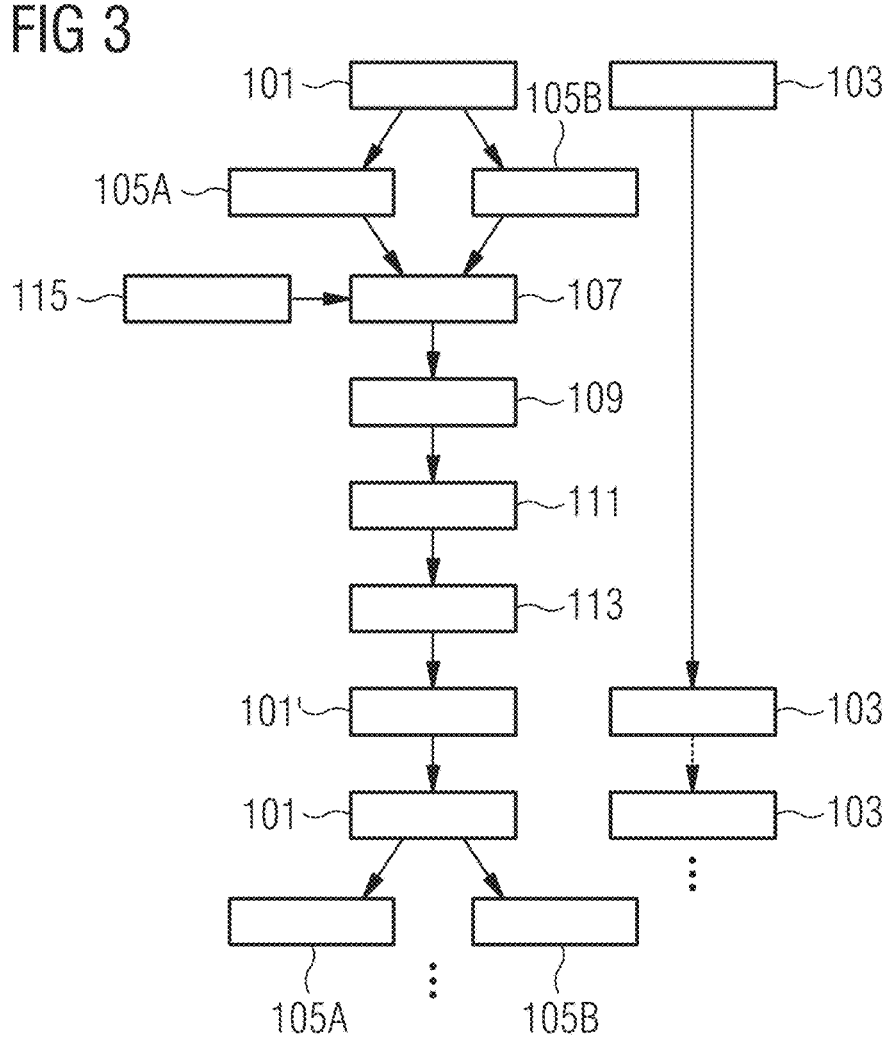
FIG. 3 a flowchart illustrating an exemplary calibration procedure during additive manufacturing.

FIG. 3 shows a flowchart for an exemplary calibration procedure. The re-melting process requires as a first step 101 irradiating a calibration area 21A of the layer of the powdered material 5 with at least one of the first irradiation beam (laser beam 15A in FIG. 1) and the second irradiation beam (laser beam 15B in FIG. 1) and forming an intermediate top face 31 of the calibration object 21; the calibration area 21A is associated with a cross-section of the calibration object 21 in the X-Y-plane (see FIG. 1).

As said, the formation of the intermediate layer 29A of the calibration object 21 takes place during the layer-wise manufacturing of the objects 3, e.g., while or shortly before or after irradiating (step 103 in FIG. 2) an object area 3A of the layer of powdered material 5 (see FIG. 1) with at least one of the first irradiation beam and the second irradiation beam; the object area 3A is associated with a cross-section of the (target) object 3 in the X-Y-layer plane. In other words, steps 101 and 103 take place during manufacturing of a layer of powdered material 5.

It is noted that in principle the one intermediate layer 29A of the calibration object 21 processed in step 101 may include several layers of one of the objects 3, if, e.g., thinner layers are required. I.e., step 103 may be performed several times before a sufficient thickness of a powder layer is accumulated for the calibration procedure. In principle this can also be the case vice versa.

Once the intermediate top face 31 is formed, in step 105A, the first irradiation beam is guided with the first scanning optic 17A over the calibration area 21A. Thereby, the first irradiation beam melts a first calibration pattern having a first geometrical feature (e.g., the cross 37 has a crossing point of the lines) into the top face 31. Similarly, in step 105B, the second irradiation beam is guided with the second scanning optic 17B over the calibration area 21A. Thereby, the second irradiation beam melts a second calibration pattern having a second geometrical feature (e.g., the cross 39 has a crossing point of the lines) into the top face 31. Steps 105A and 105B can be performed sequentially or simultaneously.

Now, having re-melted the two calibration patterns on the intermediate calibration layer 29A, the calibration camera 23 takes one or more images from the top face 31 (step 107). The one or more images are processed by the image analysis sub-routine. The image analysis sub-routine identifies an image point (e.g., crossing point 37C in FIG. 2) related the first feature of the first calibration pattern and an image point (e.g., crossing point 39C in FIG. 2) of the second feature of the second calibration pattern (step 109).

Based on the image points (corresponding to the crossing points 37C, 39C), generally from an image data-based offset, the calibration-setting sub-routine derives in step 111 a spatial offset defined in the layer of the powdered material 5 (i.e., at the level of the work surface 9B). Thus, the offset is defined between X-Y-positions in the work surface 9B that correspond to the first feature and the second feature that were identified in the acquired images. Using the information on the derived spatial offset O, at least one of the first scanning optic 17A or the second scanning optic 17B is set to reduce the spatial offset, i.e., to increase the alignment of the laser beams 15A, 15B (step 113).

As further illustrated in FIG. 3, a plurality of layers may be processed for the objects 3 with those "calibrated" settings of the scanning optics (additional steps 103). This growing is accompanied by growing also the calibration object 21 (additional layer forming steps 101' are performed only). Then, the calibration can be initiated again (step 101) followed with steps 105A and 105B etc. as described above.

To further increase the viewability of the crosses 37 and 39 in the images acquired with the calibration camera 23, the re-melting process can be adapted to affect the reflective properties of the intermediate top face 31 (here those areas that are not re-melted in steps 105A and 105B). For example, when forming the intermediate layer 29A (the top face 31), it is proposed to apply a specific hatching strategy to the powder bed within the calibrating area 21A that increases an image contrast for specific directions of illumination. The underlying concepts are described in connection with FIG. 4A to FIG. 6B.

Figure 4A:
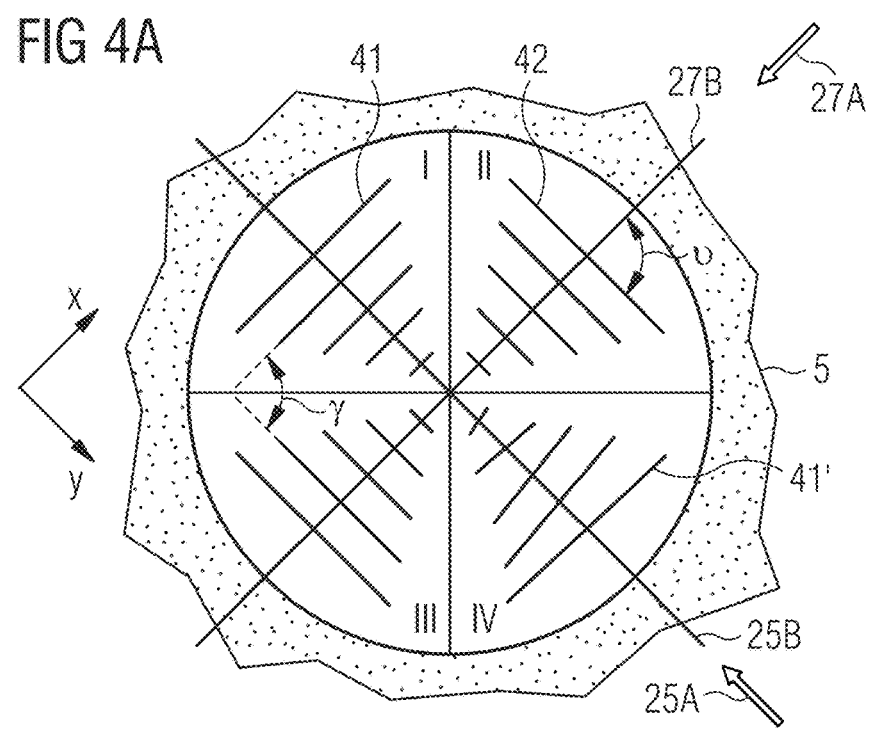
FIG. 4A is a schematic illustration of an exemplary two-beam scan procedure used for preparing an intermediate calibration layer with varying reflective properties in different portions of a respective intermediate top face.

FIG. 4A shows a schematic top view onto the top face 31 (and the surrounding powder bed/powdered material 5). The illuminating light beams 25A, 27A are indicated to fall onto the top face 31 from orthogonal directions (or at least almost orthogonal directions, e.g., under 60° to 90°). Projections of the central rays of the incident illuminating light beams 25A, 27A onto the work surface 9B are shown in FIGS. 4A to 4E by lines 25B, 27B (extending in Y- and X-direction, respectively; i.e., the line 25B and the line 27B run orthogonal to each other in the plane of the work surface 9B).

The hatching strategy divides the top face 31 in four portions I, II, III, IV. The four portions I, II, III, IV are segments of, e.g., 900 angular width (i.e., quadrants) of the circular cross-section of the calibration object 21. The portions I, II, III, IV are aligned with respect to the illuminating light beams 25A, 27A such that respective bisectors of portions I, IV extends along the line 25B and respective bisectors of the portions II, 1111 extends along the line 27B.

In each of the four portions I, II, III, IV, the hatching strategy can be specifically selected to increase the reflection of light of the illuminating light beams 25A, 27A towards the calibration camera 23. For example, the portions I, II, III, IV can be irradiated by guiding an irradiation beam along (essential) parallel scan vectors 41 or along scan vectors 41' deviating from parallel by less than 10° as schematically illustrated for portion IV in FIG. 4A. That hatching strategy within the calibration area 21A can be applied, for example, to any one or both of the laser beams 15A, 15B.

Figure 5A:
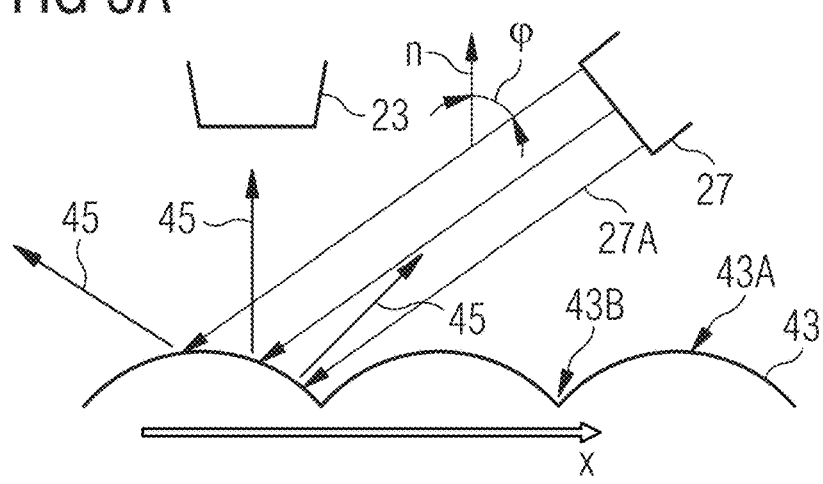
FIG. 5A is a schematic cut-view of the calibration layer through portions II or III as indicated in FIG. 3A for illustrating partial redirection of light of an illuminator onto a calibration camera.

As illustrated in FIG. 5A, when irradiating a portion of the calibration area 21A using a laser beam with parallel or largely parallel scan vectors (see, e.g., scan vectors 41, 41' in X-direction in portions I and IV or scan vectors 42 in Y-direction in portions II and III in FIG. 4A), the portion can develop a wave-shaped surface 43 with ridges 43A and recesses 43B extending in Y-direction (e.g., given in portions II and III). The consequence is that light of the illuminating light beam 27B is reflected into a variety of directions (arrows 45), inter alia towards the calibration camera 23, which even can be saturated as in FIG. 6A, for example. This is in particular the case if a specific azimuthal direction of incidence is selected, e.g. the light beam's projection line 27B extends along the X-direction. Generally, an azimuthal component $\vartheta$ can lie in the range from 45° to 90° with respect to the scan vectors 41, 42; 53A, 53B of one of the portions of the calibration area 21A (see FIG. 4A, where $\vartheta$ equals about 90°). Moreover, an inclination component $\varphi$ lies in the range from 25° to 80°, preferably in the range from 40° to 60°, with respect to a normal direction n of the layer of a powdered material 5.

Under such an illumination condition, the top face 31 appears bright in an image 47 of the calibration camera 23 (see FIG. 5C white color for portions II and III with the exception of a dark line 49 that is explained below).

Referring back to FIG. 4A, in an image taken by the calibration camera 23 when the illuminator 27 is activated, the portions II and III appear bright, while the portions I and IV appear dark. In contrast, when the illuminator 25 is activated, the portions I and IV appear bright and the portions II and III appear dark.

Figure 6A:
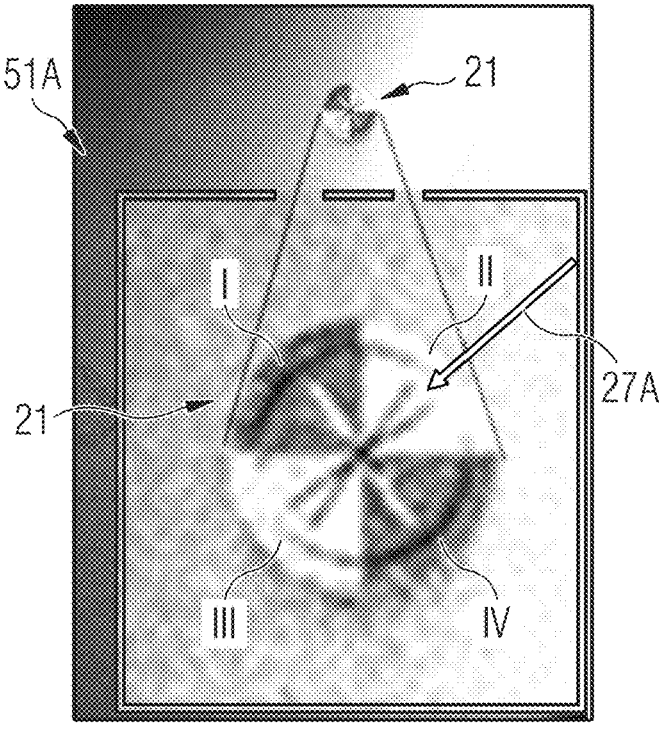
FIG. 6A and FIG. 6B show images of an intermediate calibration layer with two pairs of crossing scan lines being illuminated with respective illuminators from the side.
Figure 6B:
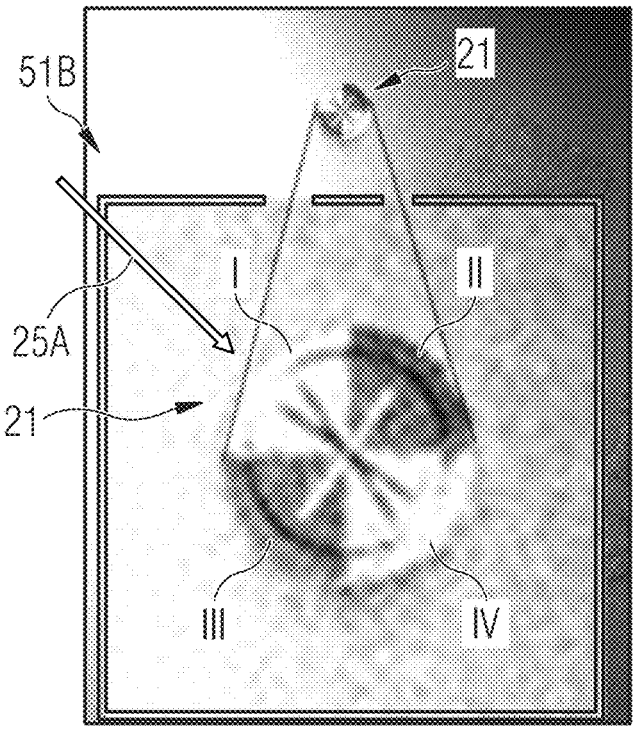

Exemplary "real" images 51A, 51B taken under those two illumination conditions are shown in FIGS. 6A and 6B. In each illumination condition, one sees opposite quadrants appearing bright or dark.

In other words, the black or white quadrants of the top face 31 are related to the specific orientation of the hatching and illumination direction. With the hatching strategy shown in FIG. 4A, two different images can be taken with respectively different illumination conditions (i.e., different illumination directions) in order to improve the contrast of the calibration pattern in the images.

Figure 4B:
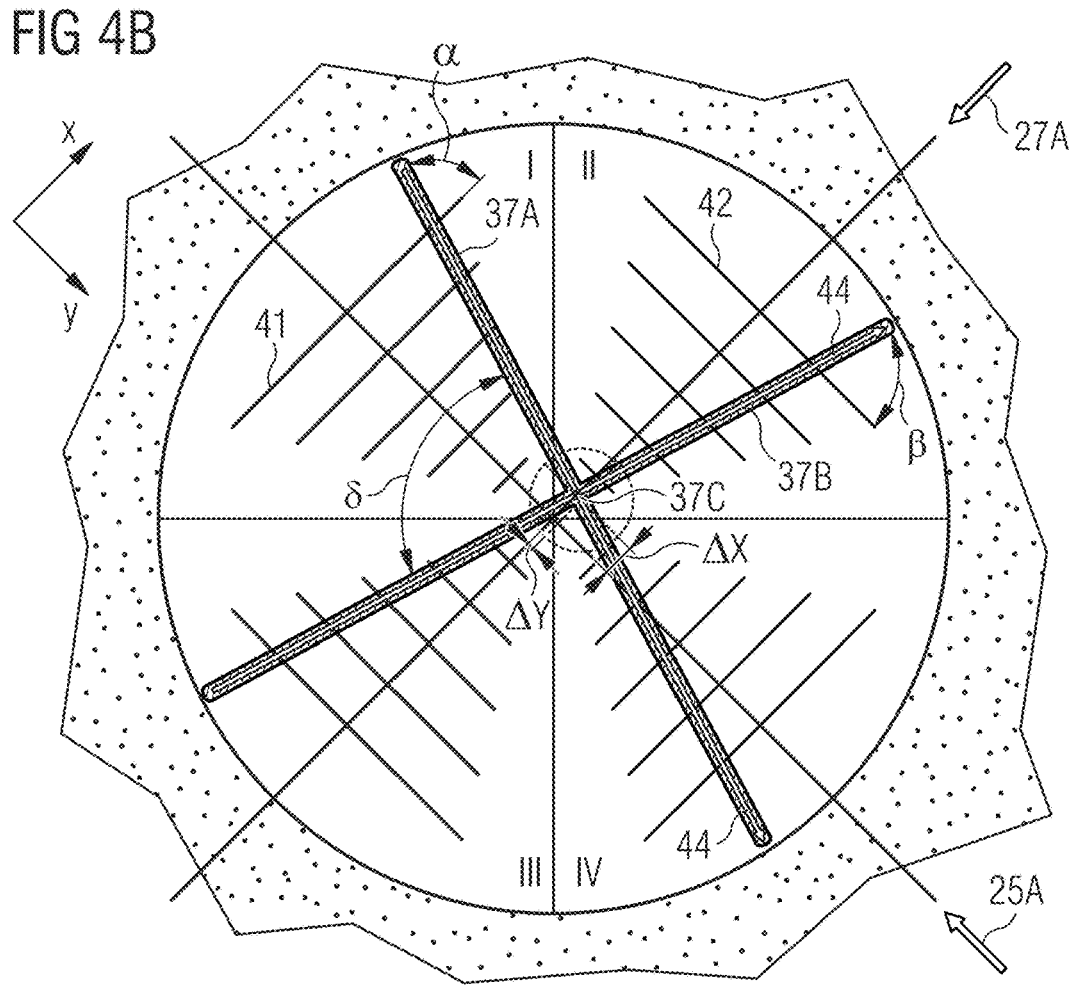
FIG. 4B is a schematic illustration of a first pair of crossing lines applied with a first laser beam onto the calibration layer prepared as shown in FIG. 3A.

FIG. 4B illustrates the first calibration pattern 37 shown in FIG. 2 with the two crossed lines 37A, 37B illustrated as hatched lines. Each line is an example of a straight-line segment. The crossed lines 37A, 37B are marked/created with a re-melting process just after the processing of the intermediate layer 29 was completed and without an additional layer of powdered material being coated onto the calibration area 21A. Each of the lines 37A, 37B is created by moving the (same) laser beam 15A linearly, i.e., with linear scan vectors 44 across the calibration area 21A.

Figure 4C:
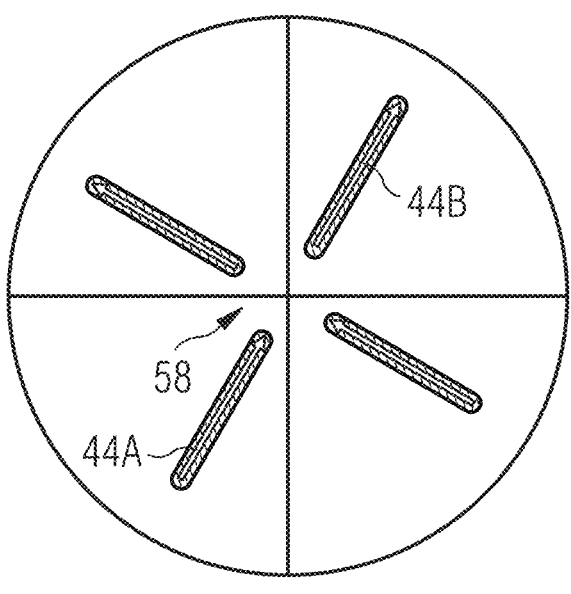
FIG. 4C is a schematic illustration of the use of scan vectors for generating crossing lines.

Referring to FIG. 4C, the use of scan vectors is further illustrated. Each of the lines 37A, 37B can be irradiated by a plurality such as eight or ten etc. parallel scan vectors 44A, 44B. In addition, in some embodiments, a central region 58 of the top face 31 may be not used for the lines 37A, 37B, because in the crossing area of the lines 37A, 37B, overheating of the powder/calibration object may occur during irradiation. Thus, scan trajectories 44A end before the central region 58 (e.g. by blocking of the laser beam) and continuing the scan on the other side of the central region, thereby respectively forming the scan trajectories 44B. It is noted that, in some embodiments, the image analysis subroutine may not need the extension of the lines 37A, 37B in that central region 58, as the crossing point 37C of the lines 37A, 37B can also be determined purely on the remaining (imaged) parts of the lines 37A, 37B outside of the central region 58.

In any case, the linear movement of the laser beam moving along the linear scan vectors 44, 44A, 44B results in a flat surface region extending in a linear shape across the wave-shaped surface 43 (at least in outer portions as discussed above).

Figure 5B:
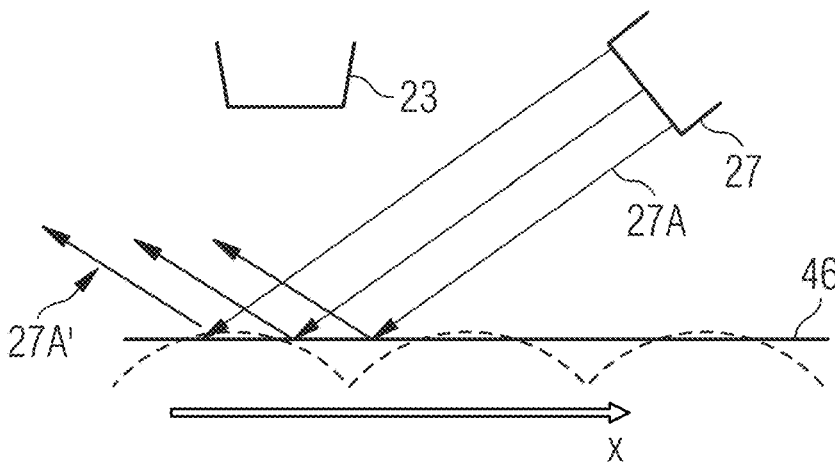
FIG. 5B is a schematic cut-view of a calibration layer along a line of a calibration pattern for illustrating specular reflection of light of the illuminator to pass by the camera.
Figure 5C:
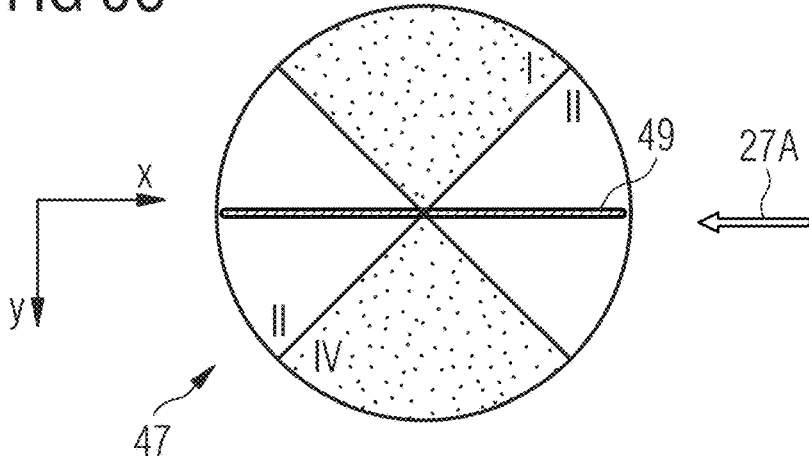
FIG. 5C is a schematic illustration of an image acquired by a calibration camera.

As illustrated in FIG. 5B, when irradiating a flat surface region 46 as generated essentially for the calibration patterns, incident light of the illuminating light beam 27A is specular reflected. A specular reflected light beam 27A' is not received by the calibration camera 23 as long as the calibration camera 23 is not positioned in the area of the specular reflected light beam 27A'. Such a situation can be generated for line segments of the crossed lines 37A, 37B that are oriented along specific incidence directions of light beams. For example, in FIG. 4B, the light beam's projection line 27B as well as the line 37B extend along the X-direction. Under such an illumination condition, the dark line 49 appears in the image 47 acquired by the calibration camera 23 as shown exemplarily for the straight-line segment extending through the portions II and III in FIG. 5C.

As shown in FIG. 4B, the line 37A extends mainly in the portions I and IV and it is oriented with respect to the scan vectors 41, 41' used for those portions under an intersecting angle $\alpha$ in the range from 45° to 90°, preferably under an intersecting angle $\alpha$ in the range from 60° to 80°, exemplarily under 70°. Similarly, the line 37B extends mainly in the portions II and III and it is oriented with respect to the scan vectors 42 used for those portions under an intersecting angle $\beta$ in the range from 45° to 90°, preferably under an intersecting angle $\beta$ in the range from 60° to 80°, exemplarily under 70°.

FIG. 4B further shows that the crossing point 37C of the lines 37A, 37B is located in the portion II and is displaced with respect to a center of the top face 31 by $\Delta X$ and $\Delta Y$. The crossing point 37C is a feature of the first calibration pattern (here the cross 37) that is to be identified based on image(s) taken with the calibration camera 23.

It is noted that the surface of the intermediate layer 29A may deviate from the above described general surface features, for example, in the area in the center of the top face 31 (where all portions come together) as well as the area of the crossing of the straight-line segments. Thus, the image analysis sub-routine can focus on those segments within the portions that are less affected and show the expected surface features, usually the inner areas of the portions.

Regarding the identification of the position of the crossing point 37C, the image analysis sub-routine may identify two linear line segments in portions I and IV for line 37A in image data acquired under illumination with the illuminator 25. Similarly, the image analysis sub-routine may identify linear line segments in portions II and III for line 37B in image data acquired under illumination with the illuminator 27. The image analysis sub-routine may then calculate extensions of the linear line segments and identify the position first in the image plane (i.e., in the image data) and then transfer the position onto the work surface 9B.

Figure 4D:
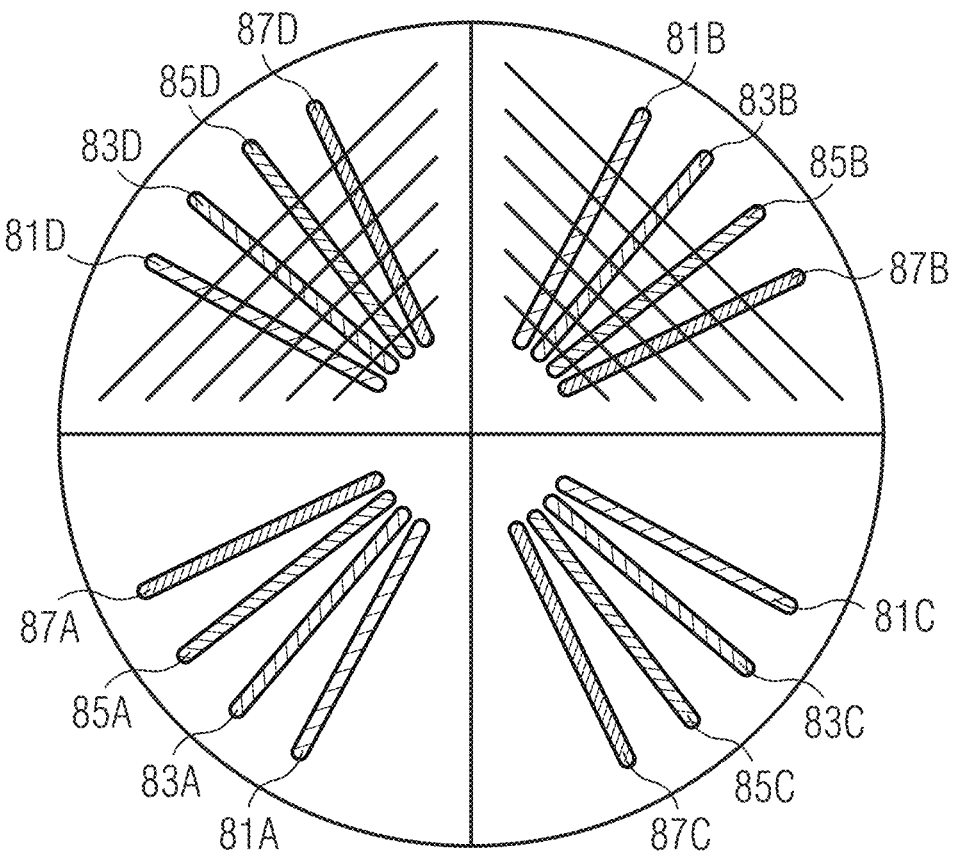
FIG. 4D is a schematic illustration of calibrating a plurality of scanning optics.
Figure 4E:
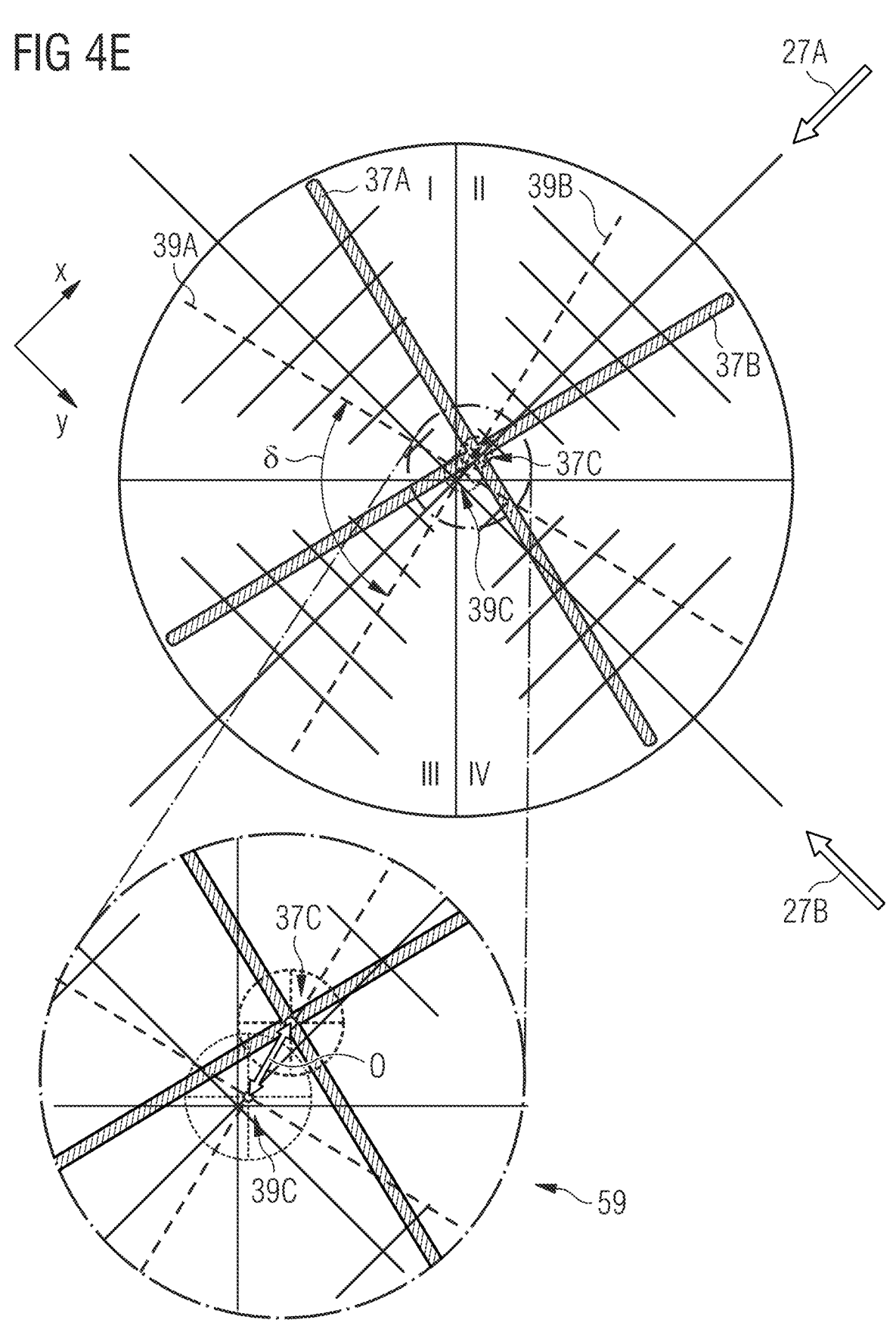
FIG. 4E is a schematic illustration of a second pair of crossing lines applied with a second laser beam onto the calibration layer as shown in FIG. 3B

In FIG. 4E, the top face 31 is shown additionally with a second calibration pattern, here the cross formed by lines 39A, 39B. As discussed in connection with FIG. 4B, the crossing point 39C can be identified and its position in the work surface 9B derived.

In addition, a magnified part 59 of the central area of the top face 31 is shown in FIG. 4E. One can see a spatial offset O between the crossing point 37C and the crossing point 39C. Based thereon the scanning optics 17A, 17B can be aligned for correct guiding of the laser beams onto the work surface 9B.

Referring again to the images 51A, 51B of the calibration section 21A shown in FIGS. 6A and 6B, one sees in each case two dark lines extending through the lit-up portions II, III and I, IV, respectively. The dark lines relate to the lines 37B, 39B and the lines 37A, 39A respectively. In light of the images it becomes apparent, that the crossing lines should be rotated with respect to each other and preferably run on opposite sides with respect to the light beam's projection line as than the optical conditions are comparable for the lines.

It is noted that in each case also a lit-up line in the dark quadrants can be seen due to curvature present across the otherwise flat surfaces, resulting in partial redirecting of the light beam towards the calibration camera 23.

For example, the images 51A, 51B can be processed by the image analysis sub-routine for deriving image points corresponding to the respective crossing points as described above.

The above exemplary implementation of the calibration was based on a cylindrical shaped calibration object and a separation of the top face into for equal quadrants.

However, the concepts can be applied to a variety of geometries.

Figures 7A, 7B:
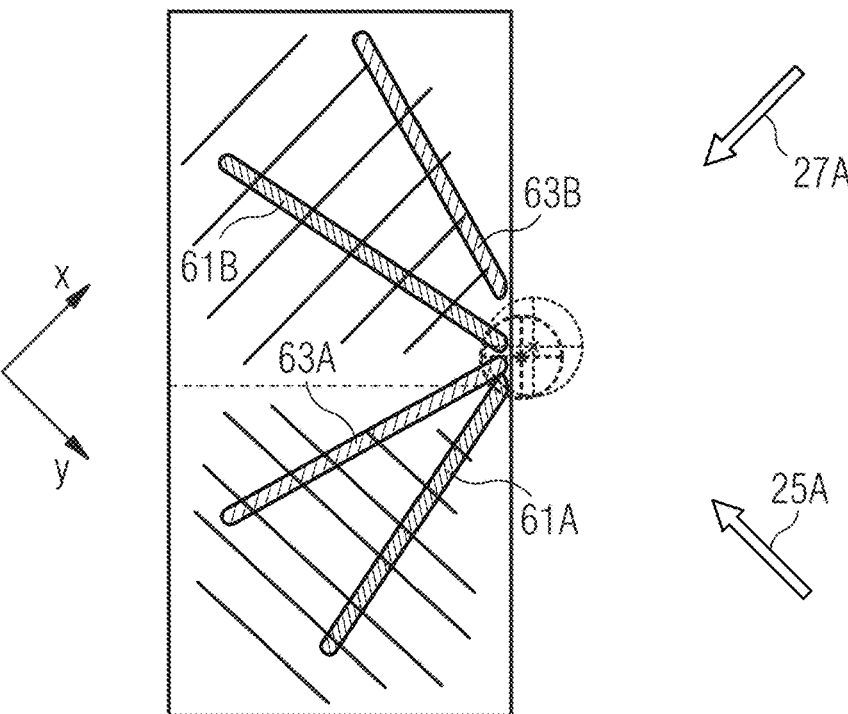
FIG. 7A and FIG. 7B are schematic illustrations of an alternative configuration of a calibration object and a further calibration procedure, respectively.

Referring to FIG. 7A, another implementation is based on a rectangular cross-section of the calibration object. The cross-section is divided into two rectangular portions I', II' and each of the portions is subject to a specific hatching strategy as indicated by scan vectors 53A and 53B (e.g., configurations of parallel scan vectors or essentially parallel scan vectors). The scan vectors 53A, 53B are oriented with respect to each other under an angle $\gamma'$ that is in the range from 45° to 90°, preferably in the range from 80° to 90°.

The calibration patterns each include linear line segments 37A', 37B'; 39A', 39B' that were generated by moving the respective irradiation beam along linear scan vectors 44'. In FIG. 7A, the calibration patterns are V-shaped, for example, and respectively include two inclined line segments. The V-shaped pattern are not required to cross within the calibration area 21A, instead by extending the detected linear segments (extensions 55, 57), reference point 37C', 39C' are defined that usually lie next to the calibration object 21. The linear extensions 55, 57 respectively cross preferably under an angle $\delta'$ in the range from 80° to 90°. As for the crosses, orientations of the linear scan vectors 44' of the first V-shaped calibration pattern are inclined with respect to orientations of the linear scan vectors 44' of the second V-shaped calibration pattern. The linear scan vectors 44' of the first calibration pattern or the second calibration pattern, respectively, extend within the at least two portions I', II'.

In a status of alignment of the first and second scanning optics 17A, 17B, the first reference point 37C' and the second reference point 39C' differ in position by (i.e., have an offset of) less than a threshold value. The threshold value is optionally equal to or smaller than a laser beam spot size (e.g., about 50 $\mu$m to 100 $\mu$m).

For enhancing the contrast, applying again specific illumination directions with respect to the hatching strategy/orientation of the scan vectors, the one or the other of the rectangular portions I', II' will appear bright/dark in an image acquired by the calibration camera 23. Similarly, the straight-line segments 37A', 37B'; 39A', 39B' can appear dark in the respective lit-up rectangular portions I', II' such that an image analysis sub-routine can derive the respective image points for the reference points of the calibration patterns and initiate an alignment of the scanning optics 17A, 17B.

Referring to FIG. 7B, in addition to determining an offset between the respective scanning optics by comparing crossing lines associated to different laser beams, the herein described concepts further allow the calibration of a scanning optics when patterns are compared generated with the same laser beam. In FIG. 7B, the straight-line segments 61A, 61B and 63A, 63B were generated with one of the laser beams 15A, 15B, for example. This allows tuning the scanning optic and/or setting a zero-point of the scanning optic to properly displace/move the laser beam spot across the powder bed in line with a machine coordinate system.

In general, the herein disclosed concepts can reach accuracies in the range of 20 μm and smaller for a 50% spot size of about 30 μm.

As will be explained the above calibration of an individual scanning optics as well as the relative calibration between scanning optics can be down with varying response times.

Figure 8A:
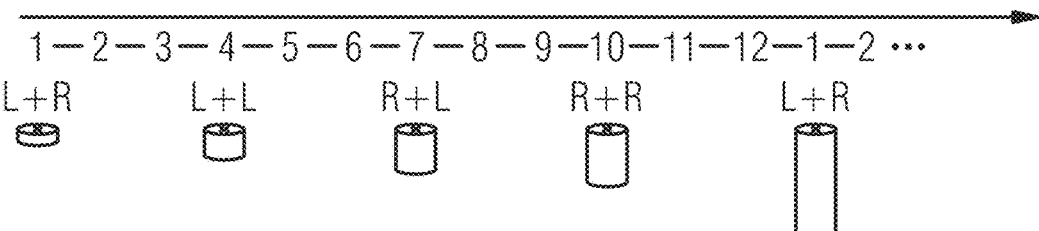
FIG. 8A und FIG. 8B are schematic illustrations repeating calibrating and readjusting irradiation systems during additive manufacturing and the resulting offset reduction.

As shown in FIG. 8A, four types of calibration measurements are performed in a repeating manner with two laser beams L and R guided by respective scanning optics. The sequence is set such that a specific type of a measurement is repeated every twelfth layer, for example. Accordingly in that example, crosses may be generated for:

(1) a relative calibration of laser beams L and R at an initial layer 1, (2) a calibration of laser beam L at layer 4, (3) a relative calibration of laser beams R and L at layer 7, (4) a calibration of laser beam R at layer 10, and so on .
. . .

It is noted the inverse reference to laser beams L and R in measurements (1) and (3) according to which the crosses are associated in an alternating manner to the laser beams L and R to reduce systematic errors.

It is noted that measurements (2) and (4) can be utilized for the zero setting of the measurement system, specifically of each scanning optics. Similar to the scale for weighing: before to weigh something, you have to press the "ZERO" button. In this way, we are "pressing the ZERO button" in every measurement (12 layers).

Figure 8B:
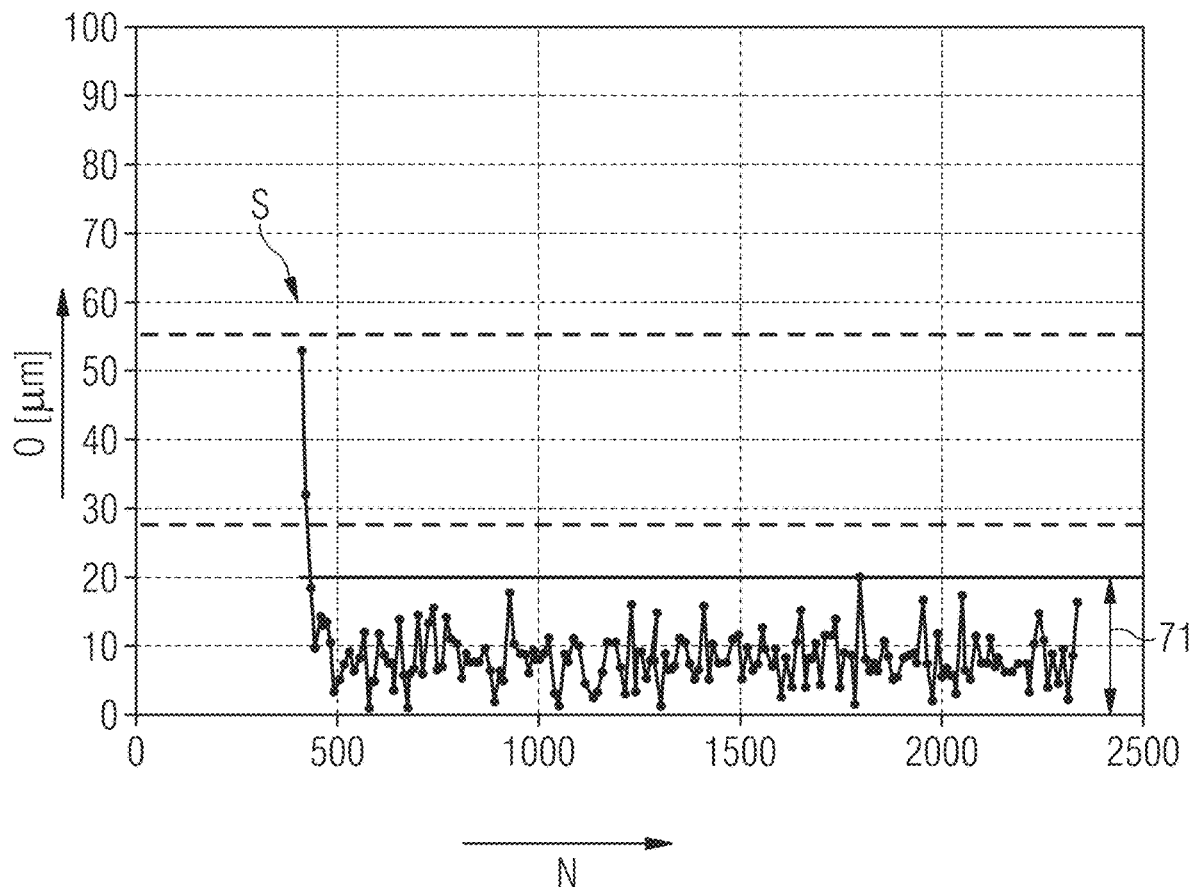

Based on such a sequence of calibration measurements, the offset O can be maintained below a preset threshold value. FIG. 8B illustrates an exemplary development of a measurement of the offset O over a large number of layers N in an "alignment accuracy" graph. Until a layer S, the calibration procedure is not performed such that at the layer S a large offset of above 50 μm is measured. As soon as the correction is enabled, the offset O is reduced and stabilized below an acceptable threshold value 71 such as, for example, a threshold value of 20 μm.

While the forgoing discussion exemplarily referred to the calibration of two laser systems, large powder beds may even require more than two laser beams and thus calibration of more than two scanning optics. Similarly, this may be the case, if several laser beams are used to accelerate the manufacturing.

The skilled person will acknowledge that a pair-wise calibration of scanning optics can be performed. The pair-wise calibration may be performed during the growing of the calibration object by alternating the irradiation of the to be calibrated laser beams. Alternatively, several calibration objects, one for each to be calibrated pair of laser beams, may be grown, or a large calibration object with different sections assigned to the respective pairs of laser beams can be used (e.g. having a rectangular shape of lined up sections, or a circular shape with equally distributed sections. In this case, usually one of the laser beams will be considered a master laser beam and the "other" scanning optics will be calibrated each with respect to the scanning optic of the master laser beam, e.g. for four laser beams 1, 2, 3, 4, one could calibrate the laser beams 1:2, 1:3, and 1:4 with laser beam 1 being the master laser beam.

Moreover, referring to FIG. 4D, it will be understood that by increasing the size (e.g., the diameter) of the calibration object, it becomes possible to discriminate a plurality of different lines, being marked into the top face 31 of only one calibration object. The discrimination can become possible even if the different lines differ in orientation only a little bit, such as having angular differences in the range of only a few degrees. FIG. 4D illustrates four pairs of crossing lines, each composed of two sections: i.e. lines 81A/81B-81C/81D, lines 83A/83B-83C/83D, lines 85A/85B-85C/85D, and lines 87A/87B-87C/87D respectively form a cross and define a respective crossing point for calibration. The lines are used to mark a calibration object selected in size depending on the resolution of the calibration camera and quality of the image analysis. As shown in FIG. 4D, still all pairs of crossing lines can be marked with an angle near to 45 deg. In particular in this case, one can reduce the laser irradiation/marking in the central region to avoid an increase of energy density beyond some threshold.

Even in this case, one will consider a selected one of the laser beams as the master laser beam. All the other laser beams are calibrated, i.e., the scanning optics are shifted with respect to the zero-points, to over-position themselves with respect to the master scanning optic.

To summarize, during an additive manufacturing process, am, e.g., column-like, calibration object can be grown together with one or more target objects. Repeatedly during the additive manufacturing process (for example, periodically), laser markings are written onto specifically selected intermediate calibration layers of the calibration object. A laser marking may be for example a calibration pattern such as across that at a specific moment is melted into a top face of the column-like calibration object. Then, a calibration camera is used to acquire images of that laser marking.

A contrast enhancement may be achieved by specifically adapting the additive manufacturing process of the calibration layer to available illumination conditions. For example, essentially parallel scanned vectors may be used with specific portions, thereby increasing the reflection of light toward the calibration camera. In contrast, if the laser marking includes linear sections in the direction of the incident light, the calibration camera may receive less scattered light from those laser markings. Based on one or more acquired images, an algorithm can process and analyze the image data to calculate an offset between laser markings produced with different laser beams (relative calibration), i.e. different laser sources guided by different scanning optics. A respective feedback can then be sent to the scanning optics in order to maintain the correct alignment of the laser beams/scanning optics. Alternatively, calibration of a single scanning optic can be done when producing the laser markings with the same laser beam.

Another aspect disclosed herein relates to image acquisition and in particular to image acquisition based on multiple cameras. For image acquisition and also for metrological applications in mechanical engineering, an image often is composed of several individual images taken for portions of a desired to be imaged area. In some situations, a lack of high-contrast structures makes automated stitching difficult or leads to a loss of precision for subsequent metrological measurements. Stitching if images via the detection and assignment of edges and/or corners and generally marked points, as examples of characteristic features, may therefore not be effective and applicable.

In particular for additive manufacturing devices with large building platforms, a single monitoring camera/view point may not be sufficient to provide a complete view of the building platform. For example, if a building platform exceeds a certain size (e.g., with diameters in the range of about 500 mm and more), a single monitoring camera will not provide the required detail resolution for the complete area of building platform. Thus, the required monitoring image is assembled from several images taken by different monitoring cameras or by a camera moving over the building platform.

Figures 9A, 9B:
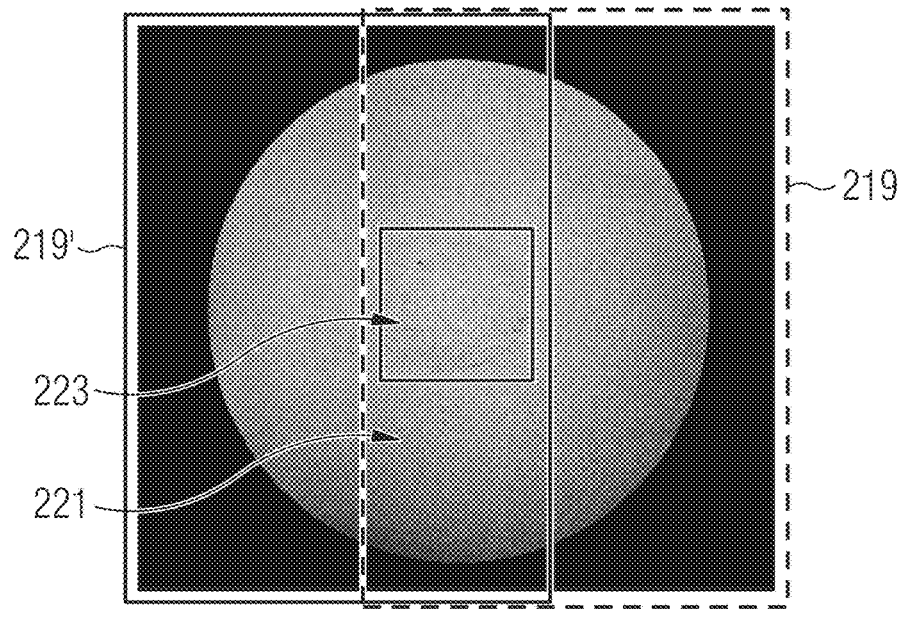
FIG. 9A and FIG. 9B are a schematic view of an exemplary additive manufacturing device with two powder bed cameras and an image of a powder bed, respectively.

In FIG. 9A, a plurality of monitoring cameras 19, 19' are schematically shown. FIG. 9A corresponds to FIG. 1 with the exception of the number and position of the monitoring cameras 19, 19'. For the respective description of the remaining features of the additive manufacturing device, it is referred accordingly to the description of FIG. 1 above.

The manufacturing process can be monitored with the monitoring cameras 19, 19'. The monitoring cameras 19, 19' are positioned above the building platform 11 and, for example, symmetrically with respect to a center of the building platform 11. The building platform 11 and in particular the powder bed can be considered a to be imaged area. Due to their purpose, the monitoring cameras 19, 19' may also be referred to as powder bed cameras. The monitoring cameras 19, 19' can have a resolution of about 90 μm per pixel and may be configured for a low distortion of the acquired images of the work surface 9B.

As explained in connection with FIG. 1, the controller 20 is data-connected to the monitoring cameras 19, 19' for receiving image data.

Each of the monitoring cameras 19, 19' is associated with a portion of the building platform 11 and provides respective images of the associated portion.

FIG. 9B illustrates an image 201 of the building platform 11 as well as portions 219, 219' of the building platform 11 associated to each of the monitoring cameras 19, 19', respectively. For the complete image 201 of the building platform 11, the images of the monitoring cameras 19, 19' need to be combined, also referred to as image stitching or recordation of images. However, the stitching needs to be as accurate as possible if the combined image 201 is used for an analysis of, e.g., the powder bed surface provided on the building platform 11.

In additive manufacturing, as can be seen in FIG. 9B, the surface of the powder bed section does not have specific characteristic features that could be used for image analysis due to the diffuse scattering of the powder 5. Thus, the simple conventional procedures mentioned above for the combination of images based on specific features cannot be applied.

The in the following described stitching procedure can enable the composition of a combined image even if no recorded high-contrast features are available or lie within an overlap region 221 indicated in FIG. 9B.

Specifically, it is suggested to use a correlation algorithm that compares the texture of the images to be recorded. For the recordation, a point of maximum cross-correlation is identified. Based on the point of maximum cross-correlation, a displacement vector can be derived that indicates the shift between the images. Thus, no presence of a specific feature and the respective feature recognition is required.

Also, in other fields of the metal or steel handling industry, similar optical situations may be given such that stitching together a combined image from several individual images becomes a metrological task. An example is seam tracking within monitoring of laser cutting or laser welding procedures, in particular as respective laser cutting or laser welding devices often have (one or more) on-axis observation camera. A correctly assembled image of the seam, for example, can be used for path control of the robot arm guiding a laser head across the material to be processed. Also, in these types of applications, the individual images to be recorded have none or only few high-contrast features because welded metal surfaces may have a very smooth homogenous appearance.

In the following, the stitching procedure is described exemplarily for images of a metal surface with a laser marking such that the observer has at least some perception of relative positions. However, it is noted that in particular the images of a powder bed (such as shown in FIG. 9B) can specifically be stitched in the respective manner as will be acknowledged by the skilled person.

In this context, it is a further object of an invention disclosed herein to provide an image stitching procedure that allows combination of images, in particular images with a rather smooth appearance such as an image of a powder bed. For example, the above calibration analysis may be performed on a stitched image, if, e.g., multiple calibration objects are created at different regions of the powder bed because generally the positioning of multiple calibration objects may depend on the specific manufacturing job and the areas available for the calibration objects.

The inventors realized that although the images of powder or metal surfaces may appear homogeneously grey, they contain a texture typical for the respective material. While for the powder bed, the texture may be created due to the different orientation of the powder grains resulting in, e.g. diffuse scattering, the texture of a metal surface is given by its processing traces during manufacture of the metal workpiece.

The concepts disclosed herein are based on the fact that the resulting texture is physically connected to the workpiece. Applying a control procedure that is based on maximizing a cross-correlation function of the individual images to be stitched, individual features are not required for the registration as mentioned. The procedure is as follows.

(i) Within a search window (portion 223 in FIG. 9B), image data of the two images to be stitched are shifted against each other step by step, e.g., within a range of assumed misalignment. For the (remaining) overlap within the search window, a common cross-correlation value Corr is calculated. An exemplary cross-correlation calculation can be based on the following definition of the cross-correlation value Corr:

$$\text{Corr} = \text{Sum}\_i,j(\text{IMG1}\_ij * \text{IMG2}\_ij)/N(\text{IMG1}, \text{IMG2}),$$

where i and j represent the pixel coordinates, and IMG1 and IMG2 represent the images to be stitched. Accordingly, IMG1_ij and IMG2_ij represent pixel values of the respective images at the pixel positions i and j. The correlation value is calculated for a given relative shift between the images. Obviously, the shift may be given in one or two dimensions. N(IMG1, IMG2) represent an image specific scaling. N(IMG1, IMG2) can be, e.g. derived by image specific scalings, norm(IMG1)*norm(IMG2) such as, for example, a mean pixel value derived for an image within the search window or the complete window. In other words, the correlation value can be derived by a pixel by pixel multiplication of the pixel values of the images and the formation of a sum over the multiplication results. In line with the above, the correlation value Corr will be derived for a predefined set of potential shifts to be considered.

(ii) The calculated correlation values Corr can be stored in a correlation data map that associates a correlation value with its underlying shift. In other words, the correlation data map stores the correlation value Corr as a function of the image shift.

(iii) A maximum of the calculated correlation values Corr can be derived, for example, based on the entries of the correlation data map. The maximum of the calculated correlation values Corr indicates an image offset with a large (the highest measured) overlap of image information.

(iv) The registration of the images is then performed based on the position of the maximum of the calculated correlation values Corr in the correlation data map, the position indicating the shift between the image data.

It is noted that all pixels of the images contribute to the correlation peak because all image information from within the search window is coded within the underlying correlation function. Even very small offsets (shifts) can therefore be detected immediately.

Furthermore, it is noted that the shift can use translations as well as rotations to consider not only linear shifts but also rotations within the camera installations.

Figure 10A:
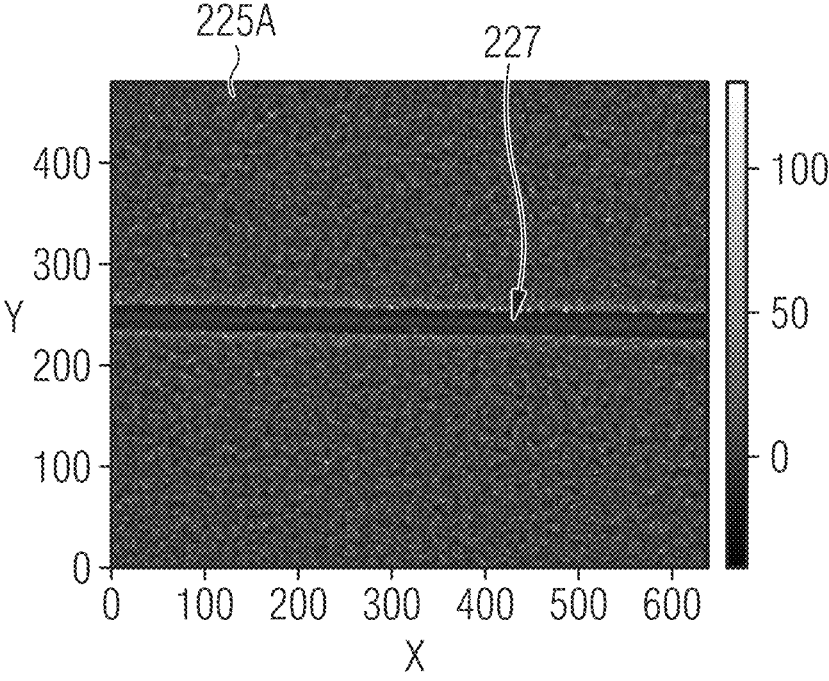
FIG. 10A and FIG. 10B are two images shifted with respect to each other.
Figure 10B:
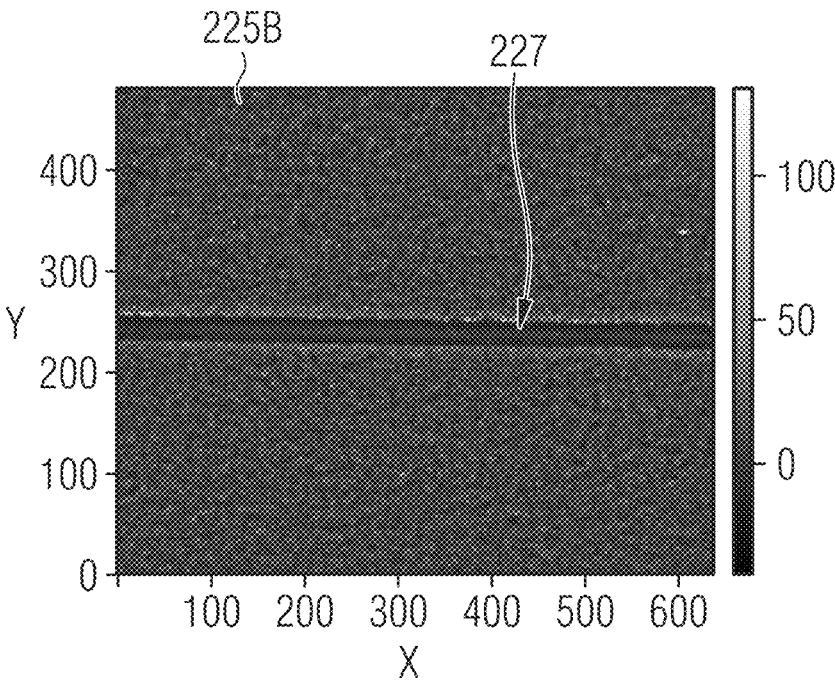

Referring to FIGS. 10A and 10B and step (i) mentioned above, two slightly shifted images are shown. The images include image data 225A and 225B with data points/image points/pixels that are associated with pixel values indicated at a grey scale at the side. The images show a metal surface with a laser-engraved contour 227. The images were taken with the help of a robot arm that moved the camera essentially along the engraving. Thus, the images represent first image data and second image data that relate to image acquisitions performed for different positions of one or more cameras with respect to an to be imaged area. When stitching the images, the stitching is based on a relative position of the images. The relative position indicates, within the coordinate system spanned by the pixels, the displacement of the pixels of one image with respect to the pixels of the other image.

The task of the image analysis is in the specific example of the images of FIGS. 10A and 10B to derive information on the movement of the camera, i.e., direction and length of the shift of the imaged areas with respect to each other, or generally the relative shift a group of essentially identical image data within the two images 225A, 225B.

For the image analysis, a search window of for example, 200×200 pixels is selected in a region that falls within each of the two images 225A, 225B. Within the search window, cross-correlation values were calculated based on the above formula.

Figure 11A:
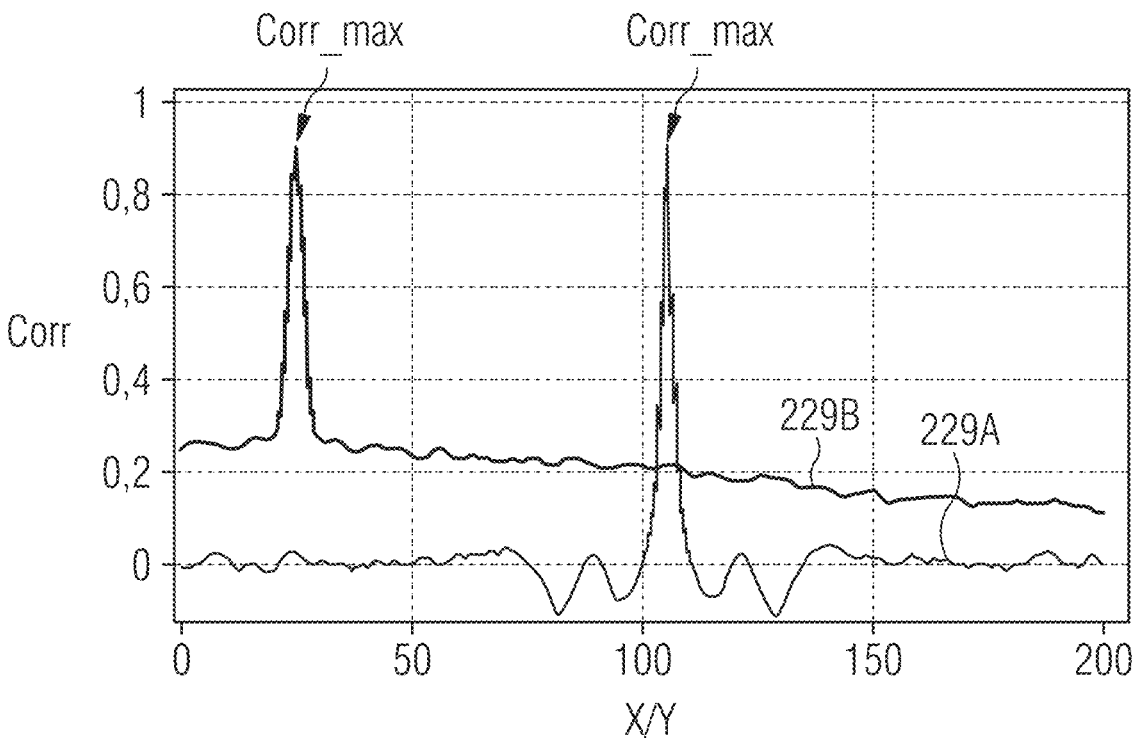
FIG. 11A and FIG. 11B are a plot with correlation curves and respective a correlation map, respectively for the images of FIGS. 10A and 10B.

Exemplary graphs of the correlation values Corr for relative shifts in a X-direction (graph 229A) and a Y-direction (graph 229B) are indicated in FIG. 11A. Exemplarily, the graphs are selected to pass through a highest correlation value Corr_max (see FIG. 11B)

Figure 11B:
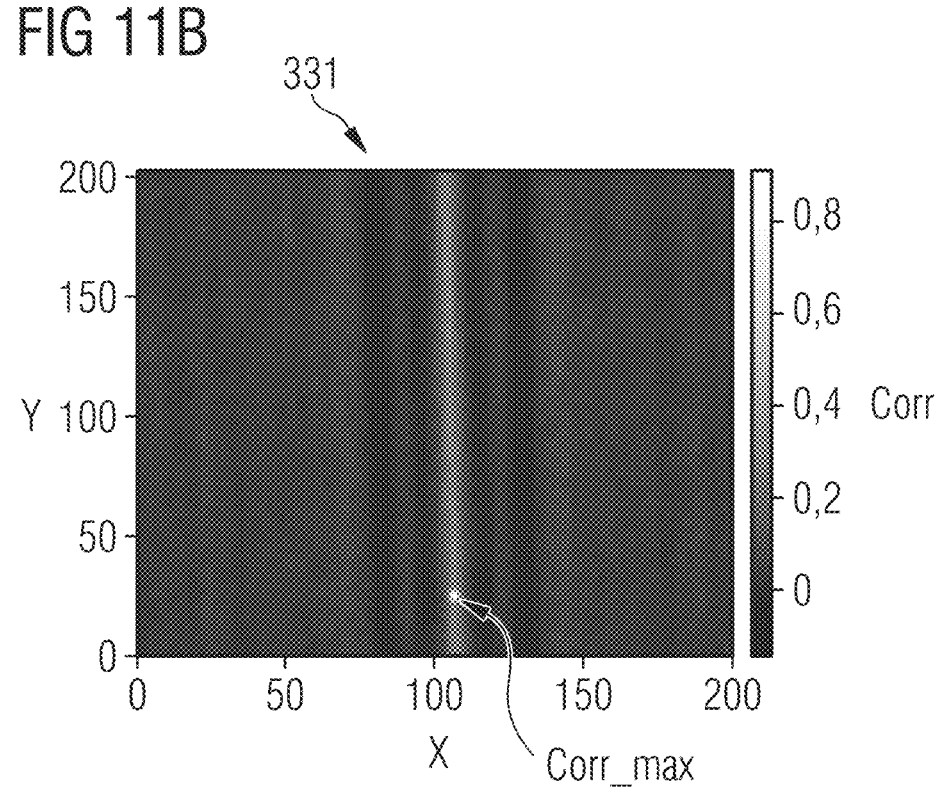

FIG. 11B shows a correlation data map 331 for all possible shifts based on the selected size and for the possible combinations of shifts in X-direction and Y-direction. A peak is shown in FIG. 11B for the highest correlation value Corr_max as a white spot in the correlation data map 331.

Figures 12A, 12B, 13:
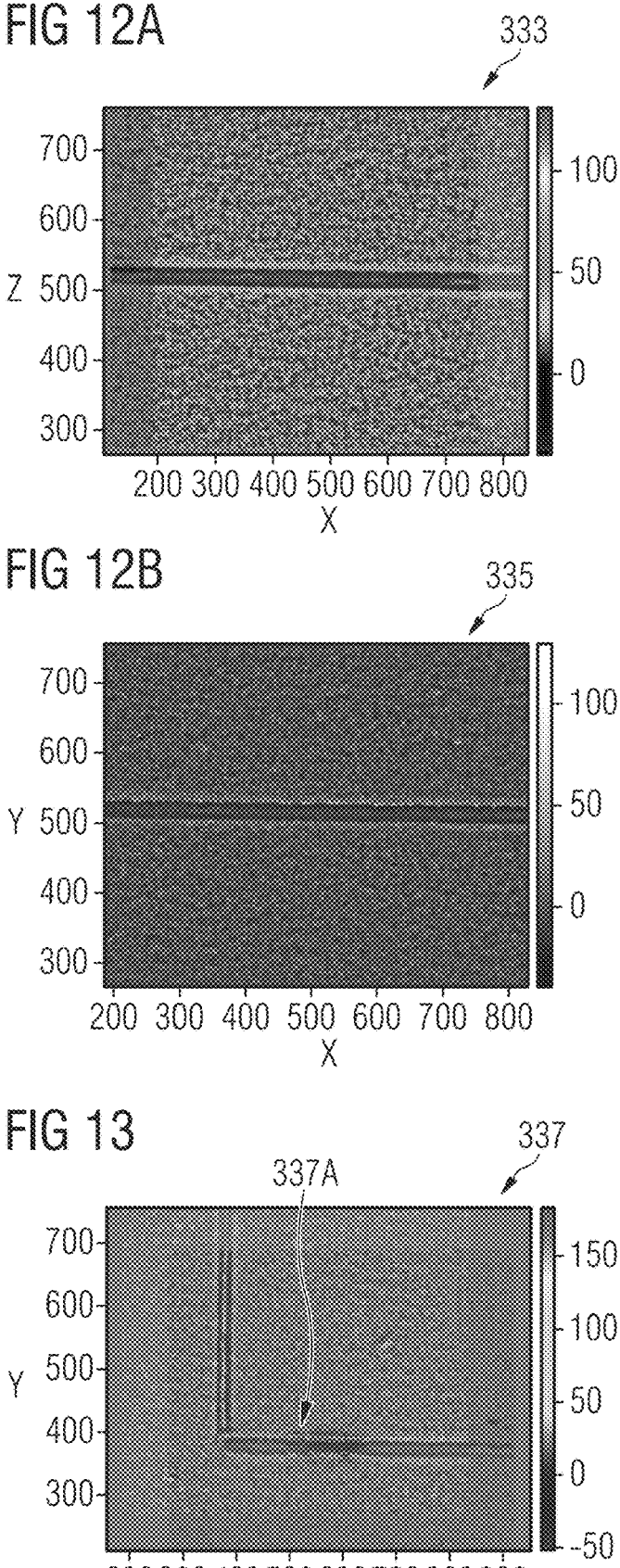
FIG. 12A and FIG. 12B are an overlaid image and a resulting composite image, respectively.
FIG. 13 is an overlaid image, where a stitching applies over a corner of the images.

Referring to FIG. 12A, a superposed image 333 can be created by a superposition of the images 225A, 225B subject to a shift based on the correlation value Corr_max. Besides a large central overlap region, one sees the border-like strips originating only from one of the images.

Referring to FIG. 12B, a combined image 335 is based—as superposed image 333—on the correlation value Corr_max. The combined image 335 includes at each pixel only a contribution from one of the images. In the combined image 335, one cannot see a transition line or break that would indicate a stitching.

Referring to FIG. 13, another example of a superposed image 337 is shown, indicating that the algorithm also provides for good stitching results of a corner-shaped laser mark 337A.

In the following, aspects relating to the image recording are summarized:

Aspect 1. A method for stitching two images of a to be imaged area, wherein the images include first image data (225A) and second image data (225B), respectively, each of the first image data (225A) and second image data (225B) includes image data of a respective portion (219, 219') of the to be imaged area, the portions (219, 219') overlapping in a common overlap region (221) of the to be imaged area, the method comprising:

defining a search window portion (223) within each of the first image data (225A) and second image data (225B);

deriving a correlation value (Corr) between the image data within the search window portions (223) of the first image data (225A) and the second image data (225B) for a plurality of relative positions of the first image data (225A) and the second image data (225B); identifying a maximum correlation value (Corr_max) among the derived correlation values; and stitching the two images for the relative position of the first image data (225A) and the second image data (225B) associated with the maximum correlation value (Corr_max).

Aspect 2. The method of aspect 1, wherein deriving the correlation value (Corr) includes a pixel by pixel multiplication of the pixel values of the image data within the respective search window portion (223), in particular in line with the respective relative position, and a formation of a sum over the results of the pixel by pixel multiplications.

Aspect 3. The method of aspect 1 or 2, wherein deriving a correlation value (Corr) includes a normalization based on the image data or the respective image data within the search window portion (223).

Aspect 4. The method of any one of aspects 1 to 3, wherein the plurality of relative positions is generated by relative translations and/or rotations of the first image data (225A) and the second image data (225B).

Aspect 5. The method of any one of aspects 1 to 4, further comprising:

storing the derived correlation values (Corr) in a correlation data map (331) or function of the relative position that associates a correlation value (Corr) with the underlying relative position, in particular a shift between the images.

Aspect 6. The method of any one of aspects 1 to 5, wherein the search window portion (223) is selected to extend over a subset of pixels in the first image data and the second image data, respectively, and the subsets correspond to sub-areas of the to be imaged area that are of the same size, and wherein the subsets in particular includes the same number of pixels; and/or wherein the search window portion (223) is preferably selected to include image data associated with the common overlap region.

Aspect 7. The method of any one of aspects 1 to 6, wherein pixels (also referred to as data points or image points) in each of the image data correspond essentially to pixel areas of the to be imaged area that have the same size.

Aspect 8. The method of any one of aspects 1 to 7, further comprising:

acquiring an image of a first portion (219, 219') of the to be imaged area, the image including the first image data (225A), acquiring an image of a second portion (219, 219') of the to be imaged area, the image including the second image data (225B), wherein the images are acquired such that each of the first image data (225A) and second image data (225B) includes image data of the common overlap region (221) of the to be imaged area.

Aspect 9. The method of any one of aspects 1 to 8, wherein the first image data (225A) and the second image data (225B) relate to images acquired with two monitoring cameras (19, 19') located at different positions with respect to the building platform (11) or with one monitoring camera (19, 19') moved into two positions with respect to the to be imaged area.

Aspect 10. The method of any one of aspects 1 to 9, wherein the to be imaged area is in particular an essentially plane surface area and/or wherein the to be imaged area is a building platform (119) with a powder bed or a metal surface, optionally acquired during additive manufacturing of an object.

Aspect 11. A device (1) for additive manufacturing of three-dimensional objects (3) from powdered material (5), the device (1) comprising:

an object forming chamber (7) with a work surface (9B) and a building platform (11), wherein the building platform (11) is adjustable in a vertical position with respect to a building platform opening (11A) for layer-by-layer manufacturing of a three-dimensional object (3) and a calibration object (21) on the building platform (11);

two monitoring cameras (19, 19') each configured to acquire an image of at least a part of the building platform (11); and an irradiation system for guiding an irradiation beam (15A, 15B) onto a layer of powdered material (5) distributed on top of the building platform (11); and a controller (20) with at least one microprocessor (20A) and at least one storage device (20B) storing instructions that are operable, when executed by the at least one microprocessor (20A), to execute the method according to any one of the aspects 1 to 9.

Finally, examples of additive manufacturing machines in which the herein disclosed concepts can be applied include selective laser sintering or selective laser melting machines such as the "mysint100", "mysint 200", "mysint 300", "TruPrint 1000", "TruPrint 2000", "TruPrint 3000", and "TruPrint 5000" manufactured by TRUMPF SISMA und/or TRUMPF. The manufacturing of metal or ceramic based elements in line with the herein disclosed concepts may find applications in various technical fields such as in medical, dental, aerospace, and automobile applications.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Although the preferred embodiments of this invention have been described herein, improvements and modifications may be incorporated without departing from the scope of the following claims.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF ELEMENTS

1 device for additive manufacturing
3 object
3A object area
5 powdered material
7 object forming chamber
9A top cover
9B work surface
11 building platform
13 powder depositing tool
15A, 15B laser beam
17A, 17B scanning optic
19 monitoring camera
20 controller
20A microprocessor
20B storage device
20C data lines
21 calibration optic
21A calibration area
23 calibration camera
25, 27 illuminator
25A, 27A illuminating light beam
25B, 27B production line
27A' specular reflected light beam
29, 29_1, 29A intermediate layer
31 top face
33 calibration pattern
35 superimposed image
37, 39 cross
37A, 37B, 39A, 39B straight-line segment/line
37C, 39C crossing point

41, 42, 44, 53A, 53B scan vector
43 wave-shaped surface
43A ridge
43B recess
45 arrow
47 image
49 dark line
51A, 51B real image
55, 57 linear extension
50 9B five-part
61A, 61B, 63A, 63B straight-line segment
I, II, III, IV portions
O spatial offset
L, R laser beam
S layer
N number of layers
Steps 101 . . .
α, β, γ, δ, ϑ, φ angle
X, Y, Z

The invention claimed is:

1. A method of aligning a first scanning optic associated with a first irradiation beam and a second scanning optic associated with a second irradiation beam during additive manufacturing of a target object, the method comprising:

irradiating an object area of a layer of a powdered material provided on a building platform with at least one of the first irradiation beam or the second irradiation beam, wherein the object area is associated with a cross-section of the target object;

irradiating a calibration area of the layer of the powdered material with at least one of the first irradiation beam and the second irradiation beam, wherein the calibration area is associated with a cross-section of a calibration object, thereby forming an intermediate top face of the calibration object, wherein the forming of the intermediate top face of the calibration object includes irradiating the calibration area in a plurality of portions, a first portion of the plurality of portions is irradiated by guiding at least one of the first irradiation beam or the second irradiation beam along scan vectors that run parallel to each other in a first orientation or deviate from running parallel by less than 10°;

guiding the first irradiation beam with the first scanning optic over the intermediate top face so as to melt a first calibration pattern having a first geometrical feature into the intermediate top face;

guiding the second irradiation beam with the second scanning optic over the intermediate top face so as to melt a second calibration pattern having a second geometrical feature into the intermediate top face;

directing a first illuminating light beam onto the intermediate top face, wherein an incident direction of the first illuminating light beam has an inclination component in a range from 25° to 80° with respect to a normal direction of the layer of the powdered material and has an azimuthal component in a range from 45° to 90° with respect to the first orientation of the scan vectors of the first portion;

acquiring at least a first image of the intermediate top face including the first calibration pattern and the second calibration pattern while the first illuminating light beam is directed onto the intermediate top face;

using at least the first image, identifying image points related to the first geometrical feature and the second geometrical feature;

from the image points, deriving a spatial offset between positions of the first geometrical feature and the second geometrical feature within the layer of the powdered material; and aligning at least one of the first scanning optic or the second scanning optic taking into account the spatial offset.

2. The method of claim 1, wherein at least one of the plurality of portions is manufactured to have a wave-shaped surface.

3. The method of claim 1, wherein the second orientation of the scan vectors of the second portion differ from the first orientation of the scan vectors of the first portion by an angle in a range from 45° to 90°.

4. The method of claim 1, wherein the plurality of portions includes two pairs of opposing portions, each pair of portions is irradiated by guiding at least one of the first irradiation beam and the second irradiation beam along scan vectors, wherein the scan vectors of the two pairs are oriented with respect to each other at an angle in a range from 45° to 90°, the first calibration pattern includes a pair of straight-line segments that cross in a first reference point defining the first geometrical feature, and each of the straight-line segments extends sufficiently long enough within one of the two pairs of opposing portions that an orientation of a respective straight-line segment is capable of being estimated, the second calibration pattern includes a pair of straight-line segments that cross in a second reference point defining the second geometrical feature, and each of the straight-line segments extends sufficiently long enough within one of the two pairs of opposing portions of the calibration area that an orientation of a respective straight-line segment is capable of being estimated, the spatial offset is a difference in positions of the first reference point and the second reference point, and the straight-line segments are respectively generated by moving the respective irradiation beam along linear scan vectors, wherein orientations of the linear scan vectors of the first calibration pattern are inclined with respect to orientations of the linear scan vectors of the second calibration pattern.

5. The method of claim 1, wherein the plurality of portions includes at least two portions irradiated by guiding at least one of the first irradiation beam and the second irradiation beam along scan vectors, wherein the scan vectors in one of the at least two portions are oriented with respect the scan vectors in another one of the at least two portions at an angle in a range from 45° to 90°, and the first calibration pattern and the second calibration pattern each include straight-line segments generated by guiding the respective irradiation beam along linear scan vectors, wherein orientations of the linear scan vectors of the first calibration pattern are inclined with respect to orientations of the linear scan vectors of the second calibration pattern, and the straight-line segments are associated with linear extensions that respectively cross in a first reference point defining the first geometrical feature or a second reference point defining the second geometrical feature, wherein the linear extensions respectively cross for the first calibration pattern and the second calibration pattern.

6. The method of claim 1, wherein each of the first calibration pattern and the second calibration pattern includes straight-line segments, the method further comprising:

in the first image, deriving straight lines that extend through images of the straight-line segments and identifying the image points, wherein the image points correspond to crossings of the straight lines, and deriving the spatial offset from a distance between the first image points in the image.

7. The method of claim 1, wherein aligning the first scanning optic or the second scanning optic includes setting an optical beam path through the first scanning optic or the second scanning optic, or a zero-point associated with the first scanning optic or the second scanning optic, for guiding the first irradiation beam or the second irradiation beam across a powder bed in line with a machine coordinate system; and/or a first layer associated with the calibration object is attached to the building platform, and the calibration object is positioned at a border region of the building platform, and/or for a plurality of layers of the powdered material applied for the additive manufacturing of the target object, the first calibration pattern and the second calibration pattern are melted into respective intermediate top faces of the calibration object to repeatedly perform the alignment of the first scanning optic and the second scanning optic throughout the additive manufacturing.

8. A method of aligning a first scanning optic associated with a first irradiation beam and a second scanning optic associated with a second irradiation beam during additive manufacturing of a target object, the method comprising:

irradiating an object area of a layer of a powdered material provided on a building platform with at least one of the first irradiation beam or the second irradiation beam, wherein the object area is associated with a cross-section of the target object;

irradiating a calibration area of the layer of the powdered material with at least one of the first irradiation beam and the second irradiation beam, wherein the calibration area is associated with a cross-section of a calibration object, thereby forming an intermediate top face of the calibration object, wherein the forming of the intermediate top face of the calibration object includes irradiating the calibration area in a plurality of portions, a first portion of the plurality of portions is irradiated by guiding at least one of the first irradiation beam or the second irradiation beam along scan vectors that run parallel to each other in a first orientation or deviate from running parallel by less than 10°;

guiding the first irradiation beam with the first scanning optic over the intermediate top face so as to melt a first calibration pattern having a first geometrical feature into the intermediate top face;

guiding the second irradiation beam with the second scanning optic over the intermediate top face so as to melt a second calibration pattern having a second geometrical feature into the intermediate top face;

directing a first illuminating light beam onto the intermediate top face, wherein an incident direction of the first illuminating light beam has an azimuthal component in a range from 45° to 90° with respect to the first orientation of the scan vectors of the first portion;

acquiring at least a first image of the intermediate top face including the first calibration pattern and the second calibration pattern while the first illuminating light beam is directed onto the intermediate top face;

using at least the first image, identifying image points related to the first geometrical feature and the second geometrical feature;

from the image points, deriving a spatial offset between positions of the first geometrical feature and the second geometrical feature within the layer of the powdered material; and aligning at least one of the first scanning optic or the second scanning optic taking into account the spatial offset, wherein a second portion of the plurality of portions is irradiated by guiding at least one of the first irradiation beam and the second irradiation beam along scan vectors that run parallel to each other in a second orientation or deviate from running parallel by less than 10°, the method further comprising:

directing a second illuminating light beam onto the intermediate top face, wherein an incident direction of the second illumination light beam has an azimuthal component in a range from 45° to 90° with respect to the second orientation, acquiring a second image of the intermediate top face including the first calibration pattern and the second calibration pattern while the second illuminating light beam is directed onto the intermediate top face, and generating a superposition of the first image and the second image, wherein the identifying of the image points related to the first feature and the second feature is performed based on the superposition of the first image and the second image.

9. A method of aligning a first scanning optic associated with a first irradiation beam and a second scanning optic associated with a second irradiation beam during additive manufacturing of a target object, the method comprising:

irradiating an object area of a layer of a powdered material provided on a building platform with at least one of the first irradiation beam or the second irradiation beam, wherein the object area is associated with a cross-section of the target object;

irradiating a calibration area of the layer of the powdered material with at least one of the first irradiation beam and the second irradiation beam, wherein the calibration area is associated with a cross-section of a calibration object, thereby forming an intermediate top face of the calibration object, wherein the forming of the intermediate top face of the calibration object includes irradiating the calibration area in a plurality of portions, a first portion of the plurality of portions is irradiated by guiding at least one of the first irradiation beam or the second irradiation beam along scan vectors that run parallel to each other in a first orientation or deviate from running parallel by less than 10°;

guiding the first irradiation beam with the first scanning optic over the intermediate top face so as to melt a first calibration pattern having a first geometrical feature into the intermediate top face;

guiding the second irradiation beam with the second scanning optic over the intermediate top face so as to melt a second calibration pattern having a second geometrical feature into the intermediate top face;

directing a first illuminating light beam onto the intermediate top face, wherein an incident direction of the first illuminating light beam has an azimuthal component in a range from 45° to 90° with respect to the first orientation of the scan vectors of the first portion;

acquiring at least a first image of the intermediate top face including the first calibration pattern and the second calibration pattern while the first illuminating light beam is directed onto the intermediate top face;

using at least the first image, identifying image points related to the first geometrical feature and the second geometrical feature;

from the image points, deriving a spatial offset between positions of the first geometrical feature and the second geometrical feature within the layer of the powdered material;

aligning at least one of the first scanning optic or the second scanning optic taking into account the spatial offset, and for each of the first calibration pattern and the second calibration pattern, melting a plurality of straight-line segments with a flat surface region, wherein, for each of the first calibration pattern and the second calibration pattern, at least one of the plurality of straight-line segments extends in the first portion and is oriented with respect to the scan vectors used for the first portion with a first intersecting angle in a range from 45° to 90°.

10. The method of claim 8, further comprising, for each of the first calibration pattern and the second calibration pattern, melting a plurality of straight-line segments with a flat surface region, wherein, for each of the first calibration pattern and the second calibration pattern, at least one of the plurality of straight-line segments extends in the first portion and is oriented with respect to the scan vectors used for the first portion with a first intersecting angle in a range from 45° to 90°, and at least one of the plurality of straight-line segments extends in the second portion and is oriented with respect to the scan vectors used for the second portion with a second intersecting angle in a range from 45° to 90°.

* * * * *